United States Patent [19]

Delpech et al.

[11] Patent Number: 5,097,263
[45] Date of Patent: Mar. 17, 1992

[54] PROCESS AND APPARATUS FOR TREATMENT OF AN ANALOG ELECTRIC SIGNAL FOR OBTAINING A PARAMETRABLE BINARY SIGNAL REPRESENTATIVE OF ITS SIGNIFICANT COMPONENT

[75] Inventors: Gilbert Delpech, Colomiers; Benoit Moulas, Launaguet, both of France

[73] Assignee: Digital Vision, S.A., Colomiers, France

[21] Appl. No.: 388,862

[22] Filed: Aug. 3, 1989

[30] Foreign Application Priority Data

Aug. 2, 1988 [FR] France .................. 88 10544

[51] Int. Cl.⁵ ........................................ H03M 7/30
[52] U.S. Cl. ............................ 341/155; 364/715.06
[58] Field of Search .............. 341/126, 155; 235/436, 235/466; 364/715.06

[56] References Cited

U.S. PATENT DOCUMENTS

| | | | |
|---|---|---|---|
| 4,329,574 | 5/1982 | Jordan, Jr. ........................ | 235/466 |
| 4,560,977 | 12/1985 | Murakami et al. ................ | 341/155 |
| 4,757,464 | 7/1988 | Zimmermann et al. ......... | 364/715.06 |
| 4,819,197 | 4/1989 | Blais ................................ | 364/715.06 |

Primary Examiner—William Shoop, Jr.
Assistant Examiner—Howard L. Williams
Attorney, Agent, or Firm—Harold H. Dutton, Jr.

[57] ABSTRACT

A process and an apparatus for treatment of an analog electric signal, in particular the image signal of bar codes, for obtaining a parametrable binary signal, the process comprising storing certain non-linear filtering parameters (MP) and, after having converted the analog signal into a digital signal (CAN), detecting sequentially the successive extremums of said digital signal (PIC) by an iterative treatment while considering said parameters, and then carrying out in each sequence a segmentation treatment (BIN) by the detection of each extremum, for extracting and storing (RAM) the length of the representative segments of the succession of extremums.

29 Claims, 15 Drawing Sheets

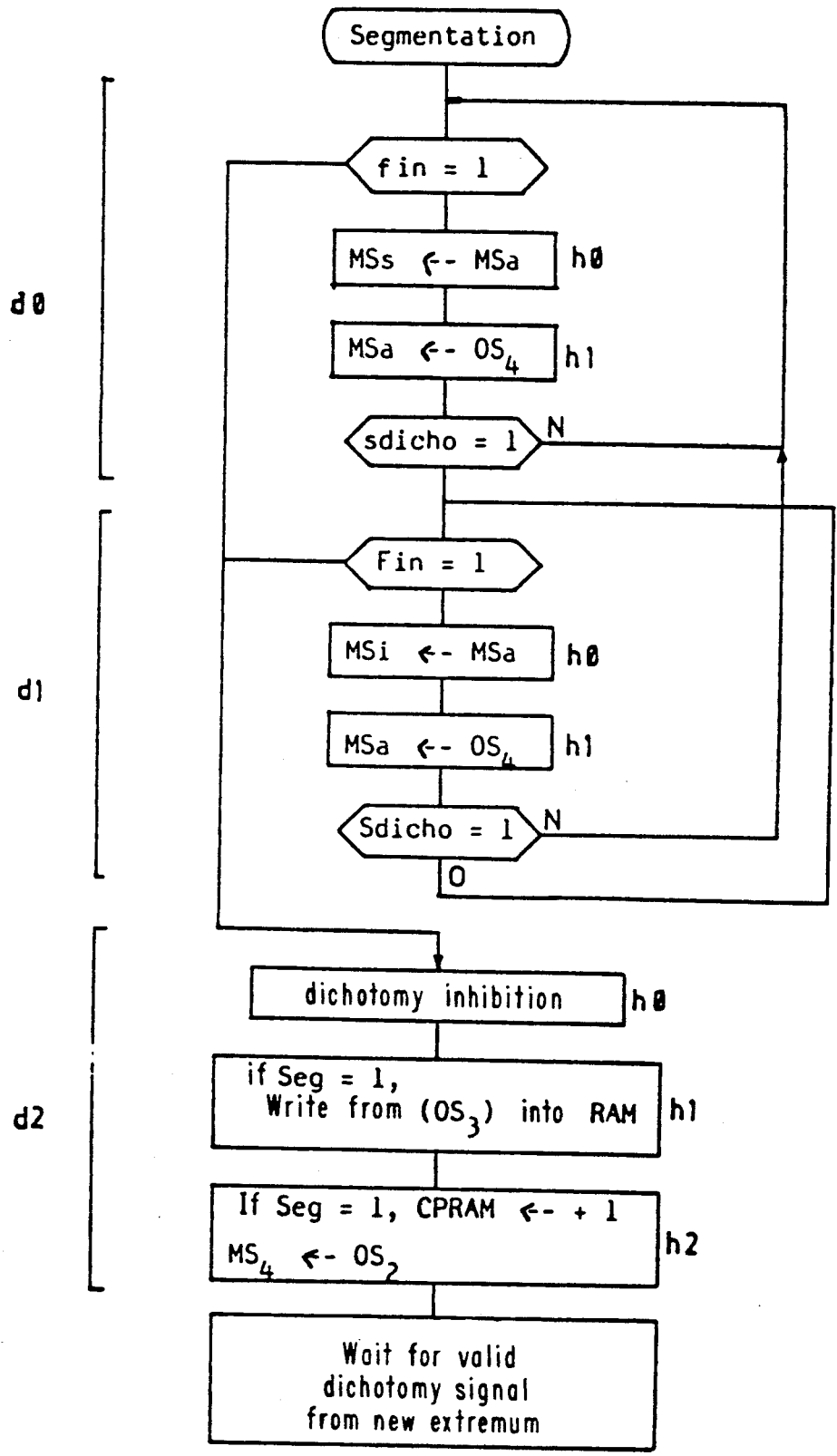

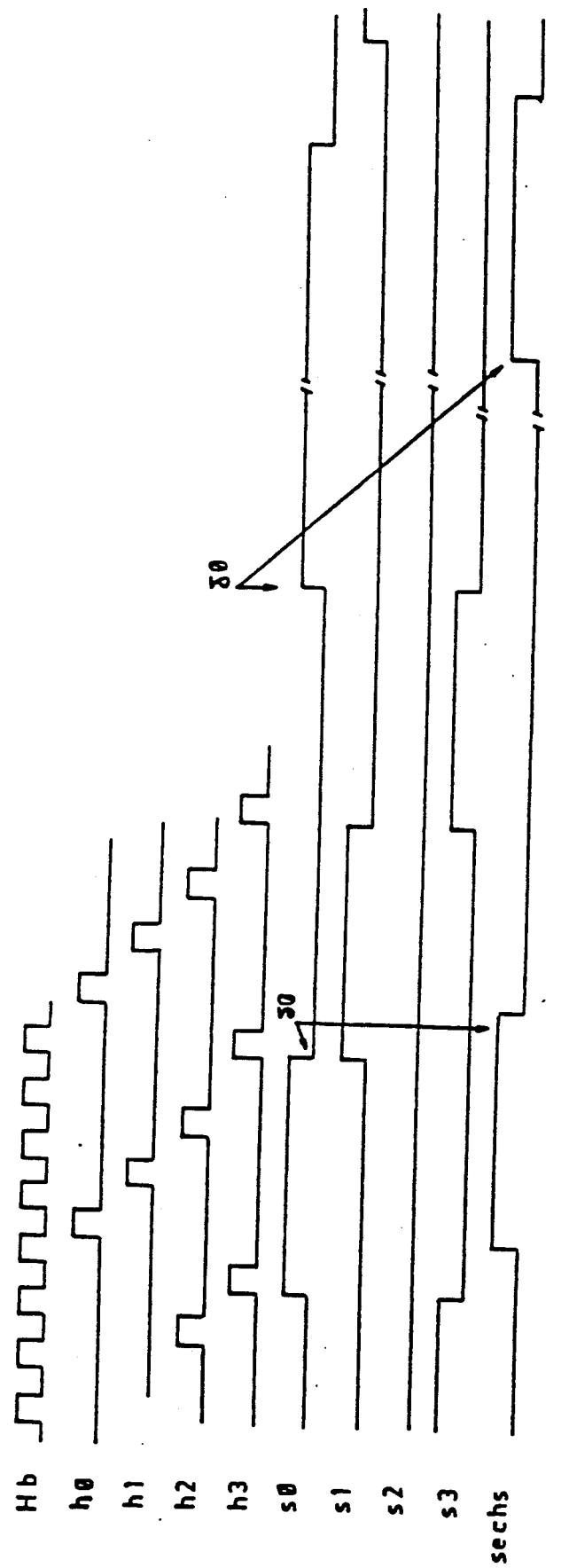

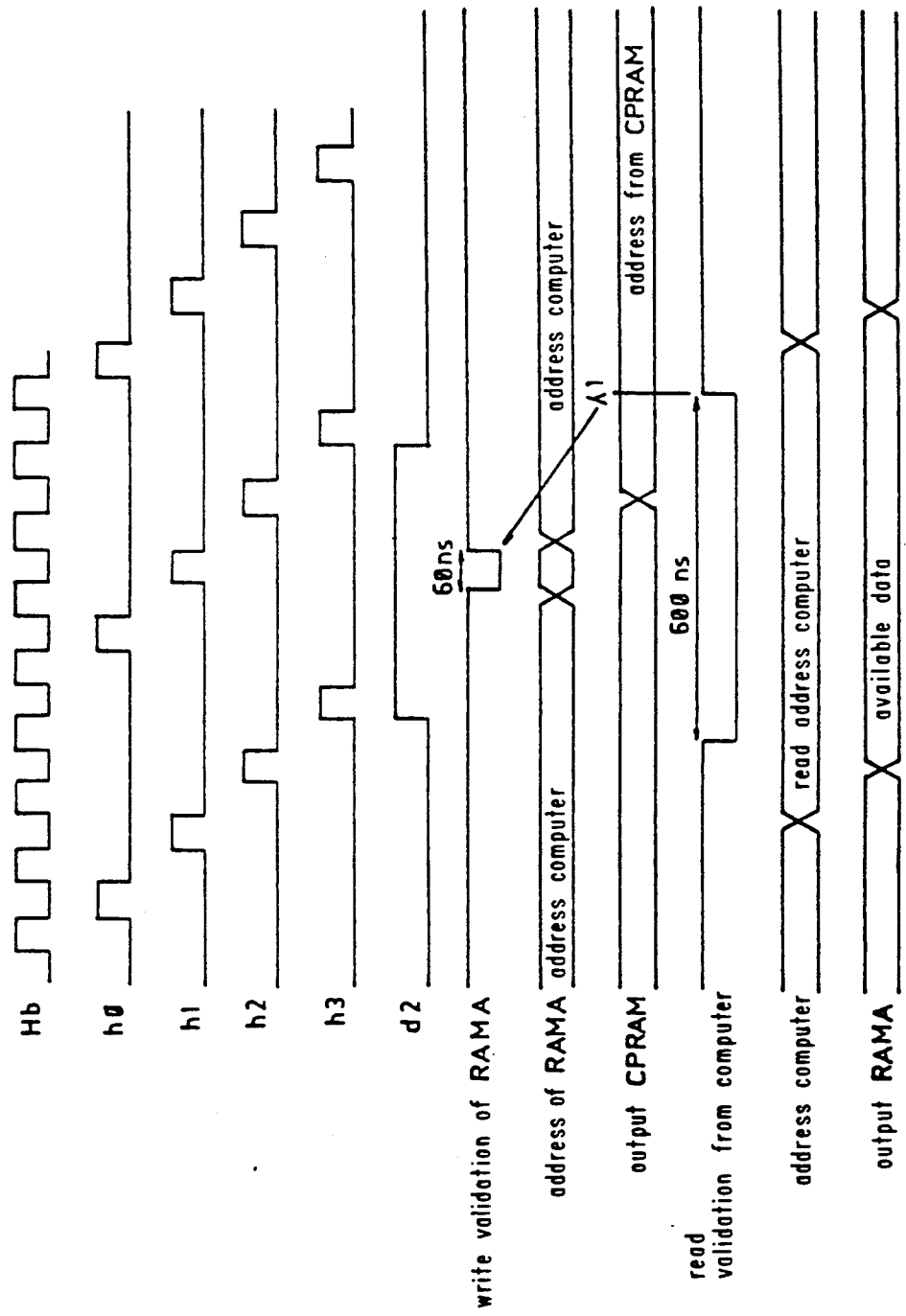

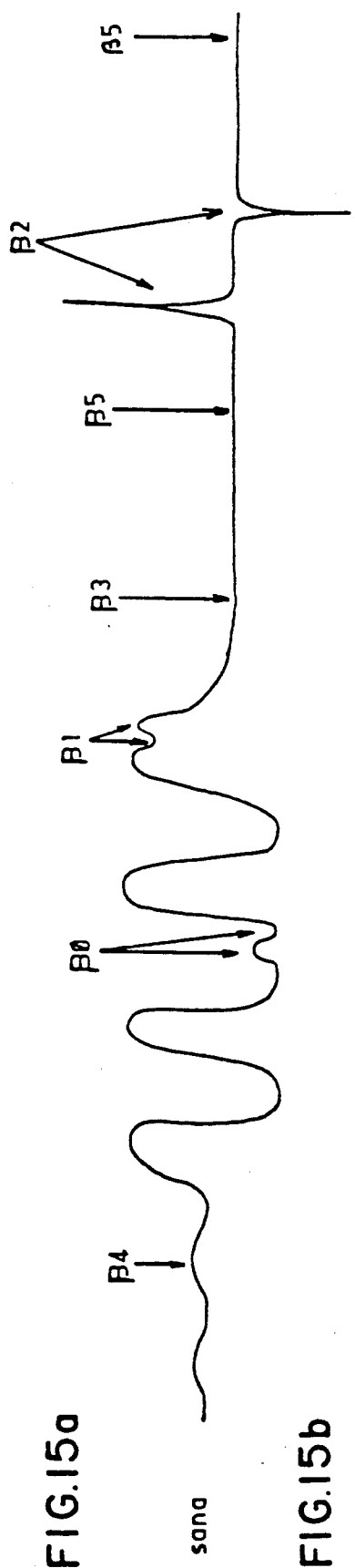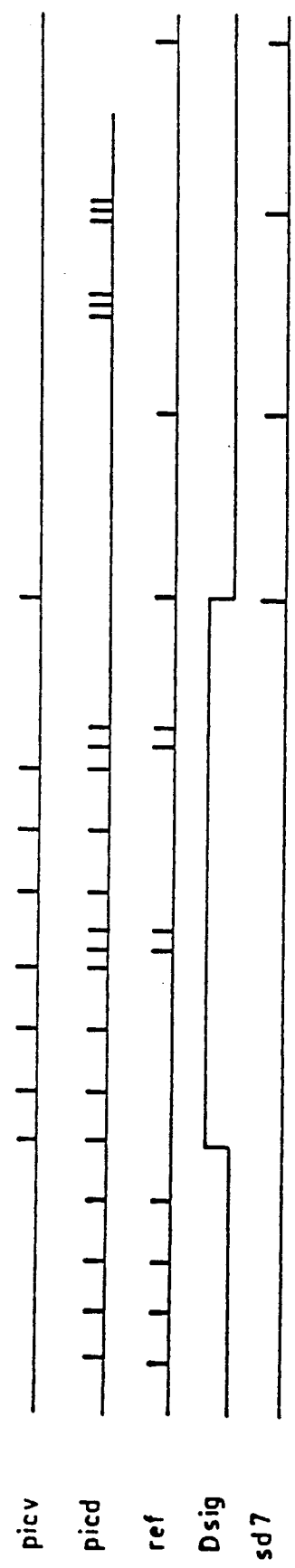
FIG.15a
FIG.15b sana picv
fin
output from MSG.
s2
d2
d3

PROCESS AND APPARATUS FOR TREATMENT OF AN ANALOG ELECTRIC SIGNAL FOR OBTAINING A PARAMETRABLE BINARY SIGNAL REPRESENTATIVE OF ITS SIGNIFICANT COMPONENT

This invention relates to a process and an apparatus for treatment of an analog electric signal comprising a significant component including successive extremums separated by rising and falling transitions, and a parasitic component comprising a parasitic modulation of the significant component and a residual noise. The invention seeks to obtain a parametrable binary signal, representative of the significant component of the analog signal and uninfluenced by the parasitic component.

The invention is applicable in all cases where significant information carried by an analog signal is to be binarized in order to thereafter be directly useable by a computer, either in real time, or with limited response delays compatible with the constraints of the time of application. In particular, the invention may be carried out for treating an analog signal representative of an image which permits compressing information into a binary form: signal delivered by a linear or matrixed charge transfer device (CCD), video signal delivered by a video camera, a signal emitted by a diode (laser or photoelectric) . . . , this image may in particular be a bar code image, a character image, a graphic image, etc.

BACKGROUND AND OBJECTS OF THE INVENTION

Devices are known for pre-treating and digitizing an analog signal for its use by a computer (French patents 2,565,746, 2,495,356 and 2,234,704; U.S. Pat. Nos. 4,101,072, 3,832,577, and 4,335,301); however in these devices, the pretreatment permitting extraction of the significant information is not parametrable, that is to say is definitely fixed without taking into account the specific characteristics of the analog signal, which brings about the impossibility of interpreting the information issuing from the treatment since the analog signal deviates from the norms for which the device has been provided. For example, in the case of a bar code, a noise greater than provided (caused particularly by a poor printing of the bars, of inadequate contrast, of poor quality members in the reader or the analog gathered string . . . ) prevents in these devices obtaining a useable binary signal. Moreover, in most of these devices, the pretreatment is carried out directly on the analog signal by a treatment of an analog nature, the binarization only taking place after leaving the treatment. One such treatment remains rustic and vitiates errors such that a nonnegligible fraction of significant information contained in the analog signal is definitely lost, while the task of the computer is made more complex, since it must correct the errors introduced.

The present invention seeks to provide an improved process and apparatus permitting obtaining a parametrable binary signal representative of the significant component of an analog signal (the parameterization may in particular be assured in real time by the computer called upon to use the binary signal, as a function of the signal which it receives, in order to adapt the treatment to the characteristics of the analog signal).

Another object is to carry out a treatment of a numeric nature on a preliminarily digitized signal in order to avoid introduction of errors or loss of significant information, as is the case in the analogical treatments carried out heretofore.

DESCRIPTION OF THE INVENTION

To this end, the process provided by the invention for treating an analog electric signal comprising a significant component having successive extremes separated by rising and falling transitions, and a parasitic component comprising a parasitic modulation of the signifcant component and a residual noise; in order to obtain a parametrable binary signal representative of the significant component of the analog signal and uninfluenced by its parasitic component, comprising:

($t_0$) in a preliminary step, memorizing the selected values for the following parameters: minimum distance —dmin— between successive extremums; and the threshhold level —a— of the residual noise, ($t_1$) converting the analog signal into a digital signal on a value system adapted to differentiate the extremums of the analog signal, the conversion being carried out with a sampling frequency sufficient to sample the transitions of said signal, in order to obtain a series of numeric samplings representative of the extremums and the transitions of the analog signal, ($t_2$) sequentially detecting the successive extremums of the numeric signal, while carrying out an iterative or repetitive treatment having as the current sequence (n) the following sequence:

storing the extremum ($E_{n-1}$) detected in the preceding sequence (n−1), storing at each step (p) of the sequence a numeric sample ($y_p$) corresponding to said step and said sample ($y_{p-1}$) of the preceding step, calculating the absolute value of the difference $|y_{p-1}-E_{n-1}|$, comparing it to the noise threshhold —a— and generating a binary comparison signal, counting down the number of steps since the beginning of the sequence for calculating the distance —d— separating the sample ($y_{p-1}$) and the preceding extremum ($E_{n-1}$), comparing this distance —d— to the minimum distance —dmin— preliminarily stored, and producing a binary comparison signal, storing the sign of the difference ($y_p - y_{p-1}$), comparing it with the sign of the difference ($y_{p-1} - y_{p-2}$) stored in the preceding step, and generating a binary comparison signal of the sign, and validating the sample ($y_{p-1}$) as a new extremum ($E_n$) and storing it in the case in which the comparison signals are representative of the conditions of the following validation:

$$|y_{p-1}-E_{n-1}| > a \quad d > dmin$$

and the sign comparison signal is representative of a sign inversion, ($t_3$) carrying out at each sequence (n) a segmenting treatment with respect to the detection of each extremum ($E_n$), by the following operations:

storing the samples ($y_1, \ldots y_p \ldots$) which are between the detected extremum ($E_n$) and the preceding extremum ($E_{n-1}$), operating on said extremums ($E_{n-1}, E_n$) a summation function for producing a threshold signal (S), searching for the average sample having a value nearest to this threshold and calculating and storing the distances ($l_n$) and ($l'_n$) of this sample with respect to the extremums ($E_{n-1}$) and ($E_n$), and calculating the distance ($l'_{n-1}+l_n$) between the average sample of the sequence (n) being considered and the average sample of the preceding sequence (n−1), and ($t_4$) storing the distances (..., $l'_{n-2}+l_{n-1}$, $l'_{n-1}+l_n$, $l'_n+l_{n+1}$ ...), calculated during the successive sequences, for generating the parametrable binary signal.

According to another characteristic of the process:

($t_0$) in the preliminary step, storing the following parameter: the ratio K of the differences of values between successive extremums, ($t_2$) detecting the extremums while adding to the current sequence (n) the following operations:

storing, at the same time as the extremum ($E_{n-1}$), the relative height ($H_{n-1}$) of this extremum with respect to that of the preceding extremum ($E_{n-2}$), comparing the difference $|y_{p-1}-E_{n-1}|$ to the value of $K.H_{n-1}$, where K is the previously stored ratio and generating a binary comparison signal, validating the sample ($y_{p-1}$) as a new extremum ($E_n$) and storing it, only in the case in which the validation conditions already defined are satisfied, and in addition, when the following inequality is satisfied:

$$|y_{p-1}-E_{n-1}|>K.H_{n-1}.$$

According to another characteristic of the process, the extremums are detected while adding, after validation of a first extremum, the following operations to each sequence (n):

calculating, at the end of the sequence (n−1) preceding the currently considered sequence (n), the sign of the difference $E_{n-1}-E_{n-2}$ and storing it, calculating at each step of the current sequence (n) the sign of the difference $y_{p-1}-E_{n-1}$, comparing the sign of the difference $y_{p-1}-E_{n-1}$ with that of the difference $E_{n-1}-E_{n-2}$ and generating a binary sign comparison signal, validating the sample only in the case in which the validation conditions heretofore set forth are satisfied and in which said sign comparison signal is representative of a sign inversion.

In the case in which the sample ($y_{p-1}$) is not valid by reason of an identity of sign of the values ($y_{p-1}-E_{n-1}$) and ($E_{n-1}-E_{n-2}$), storing said sample ($y_{p-1}$) to serve as a reference for the segmentating treatment, ($t_3$), this reference ($y_{p-1}$) being substituted for the extremum $E_{n-1}$ for operating the summation function, searching for the average sample and calculating the distance $l'_{n-1}+l_n$).

According to another characteristic of the process:

($t_0$) in the preliminary phase, storing the following parameter: the difference between the maximum amplitude Vmax between successive samples, ($t_2$) detecting the extremums while adding to the current sequence (n) the following operations:

calculating the absolute value of the difference $|y_{p-1}-y_p|$, comparing it with the difference in maximum amplitude Vmax previously stored and generating a binary comparison signal, validating the sample ($y_{p-1}$) as a new extremum ($E_n$) and storing it only in the case where the validation conditions already defined are satisfied and otherwise when said comparison signal is representative of the inequality $|y_{p-1}-y_p|<$Vmax.

Thus, at the time of detection of the extremums ($t_2$), the taking into account of the various parameters previously stored (provided especially by the downstream working computer or injected in a particular case by a user): dmin, a and preferably K, Vmax and dmax as will be seen hereinafter, permit only validating the significant extremums in order to operate a segmentation by thresholding adapted to the specific characteristics of the analog signal. The extremum detection treatment and the segmenting treatment are carried out according to a sequential numeric process, permitting working in real time, in a rigourous manner, in particular in the absence of any error due to extrapolations as is the case in analogical systems. It is necessary to emphasize that the segmenting treatment is carried out by valid extremums, that is, corrected by a parametrable detection, such that the segmentating calculations which are the longest are only carried out on significant data, which makes the process compatible with an operation in real time.

According to another characteristic of the process of the invention, the sequential detection of the extremums ($t_2$) is initiated during the initialization sequences by means of references ($R_0$, $R_1$, ... $R_m$), obtained by carrying out a repetitive initialization treatment ($t_i$) having as the current initialization sequence:

storing at each step (p) of said sequence a numeric sample ($y_p$) corresponding to said step and the sample ($y_{p-1}$) of the preceding step, comparing the absolute value ($y_{p-1}$) to the noise threshold —a— and generating a binary comparison signal, counting down the number of steps since the beginning of the treatment in order to calculate the distance —d— separating the sample ($y_{p-1}$) from the beginning of the treatment or the last reference, comparing this distance —d— to the minimum distance —dmin— and generating a binary comparison signal, storing the sign of the difference ($y_p-y_{p-1}$), comparing it with the sign of the difference ($y_{p-1}-y_{p-2}$) stored in the preceding step and generating a binary comparison signal of the sign, validating the sample ($y_{p-1}$) as a reference ($R_m$) and storing it in the case where the following initializing conditions are satisfied: first, the sign comparison signal is representative of an inversion of sign, and second at least one of the comparison signals is representative of one of the following inequalities:

$$|y_{p-1}-E_{n-1}|<a \quad d<dmin.$$

Such an initialization process permits identifying the beginning of the useful signal comprising the significant component, without losing information relative to this beginning. In effect, each of the aforementioned inequalities translates the absence of useful information and as a result, while one of them is satisfied, the system may remain in the initilizing phase without loss of information, this phase validating the successive references without validating the extremum. The system then passes into the extremum detection phase ($t_2$) when the two initialization inequalities are no longer satisfied. The last stored reference ($R_m$) then serves as the reference for detecting the first extremum.

Preferably, this iterative initialization treatment ($t_i$) is pursued parallel to the extremum detection treatment ($t_2$) in order to provide new reference extremums in case of disappearance of the significant component of the treated signal. This permits constantly providing a reference brought to light in order to recommence an extremum detection phase ($t_2$) upon reappearance of the useful signal.

According to another characteristic of the process:
($t_0$) in the preliminary step, storing the following parameter the distance —dmax— between successive extremums,
($t_1$) generating the references while adding to the current initialization sequence the following operations:
  comparing the distance —d— to the maximum distance —dmax— for generating a binary comparison signal representative of the relative values of d and dmax,
  validating the sample ($y_{p-1}$) as a new reference ($R_m$) and storing it in the case where the initializing conditions already defined are satisfied, or even in the case where said comparison signal is representative of the equality d=dmax.

According to another preferred embodiment, in the segmenting treatment ($t_3$), the searching for the average sample is carried out by a dichotomizing process comprising considering the sample situated in the midst of the segment $E_{n-1} E_n$, comparing its value with the threshhold (S), and thus approaching by successive iterations the sample having the value closest to the threshold. Such a dichotomizing search, the principle of which itself is known, has the advantage of being rapidly convergent toward the value sought.

The process of the invention may be applied most particularly for treating an analog signal representative of an image, associated with pixel synchronization pulses and synchronization pulses for the beginning and the end of lines. In this case, the various phases are carried out under the following conditions:
($t_1$) causing a correspondence between the analog/numeric sampling frequency with the frequency of the pixel synchronization pulses of a multiple thereof,
($t_i$) commencing the iterative initialization treatment at each line-beginning synchronization pulse,
($t_2$, $t_3$) stopping the treatment at each end-of-line synchronization pulse.

Such an operation permits synchronizing the phases of the process with the synchronization pulses of the analog signal treated in order to work in real time and to be adapted to the sensor which delivers the analog signal, regardless of its characteristics.

The invention also relates to a treating apparatus for carrying out the process defined previously, for delivering from an analog electric signal, a parametrable binary signal. This apparatus comprises essentially:
an assembly (MP) of registers for storing parameters and including registers ($MP_a$, $MP_{dmin}$) for storing noise (a) and minimum distance (dmin),
an analog/digital converter (CAN), arranged to carry out the conversion at a predetermined sampling frequency,
a sequencer (SEQ) adapted to control the cycles of operation to be carried out at each sampling period by a sequential validation of each functional unit of the apparatus,
an extremum detection circuit (PIC) having:
  two successive sample storing registers (Y, Y'), the first (Y) connected to the converter (CAN), and the second connected to the first,
  an extremum storing register (E) connected to the second register (Y'),
  a difference calculating operator ($OD_1$) connected to the registers (Y, Y') and associated with a sign storing flip-flop ($MD_1$),
  a difference calculating operator ($OD_2$) connected to the registers (Y', E),
  a comparator ($CD_1$) connected to the operator ($OD_2$) and to one of the parameter storage registers ($MP_a$),
  a counter ($COMP_1$) adapted to be incremented at the sampling frequency and reset to zero upon each extremum validation,
  a comparator ($CD_2$) connected to the output of the counter ($COMP_1$) and to one of the parameter storage registers ($MP_{dmin}$),
  a combinatorial calculating operator ($OD_3$), connected at its input to the operator ($OD_1$), to the register ($MD_1$), to the to the comparator ($CD_1$) and to the comparator ($CD_2$), and at its output to the sequencer (SEQ) in order to deliver thereto an extremum validation signal,
a segmenting circuit (BIN) having:
  a temporary storage memory for samples of a sequence, connected to one of the sample storage registers (Y'),
  extremum storage means ($MS_2$),
  a summing operator ($OS_1$) for summing of the amplitude of two successive extremums, associated with a threshold storage register ($MS_3$),
  a unit (DICHO) for heuristic searching for the sample nearest the threshhold, connected to the sample memory ($MS_1$), to the threshold register ($MS_3$), and to the storage means ($MS_2$),
  a distance calculating operator ($OS_2$) connected the unit (DICHO) and to the extremum storage means ($MS_2$) and associated with a temporary distance storage register ($MS_4$),
  a summation operator ($OS_3$) connected to the unit (DICHO) and to the register ($MS_4$) for calculating the length of the segment between successive average samples,
  a result memory (RAM) connected to the operator ($OS_3$) for storing the results furnished thereby.

Further, according to another characteristic, the apparatus is provided with an initialization circuit (INIT) arranged in parallel with respect to the extremum detection circuit (PIC), this initialization circuit having a combinatorial calculating operator ($OI_1$), having its input connected to the comparator ($CD_1$), to the comparator ($CD_2$), to the operator ($OD_1$), and to the sign storage flip flop ($MD_1$) and adapted to deliver to the extremum storage register (E) a reference validation signal in order to store in this register each valid reference.

According to another characteristic, the apparatus comprises a programmable phase generator (GENE), capable of delivering a parametrable sampling frequency to the converter (CAN) and synchronization pulses from the analogical signal, a parametrable frequency equal to the sampling frequency or sub-multiple thereof. In this case, the apparatus itself synchronizes the sensor (camera, C.C.D., diodes, ...) which furnish the analog signal to be treated.

The apparatus described above may be produced as an integrated circuit. The analog/digital convertor (CAN) may, if desired, be integrated on the same chip, the conversion being then necessarily carried out in real time. It is also possible to integrate on said chip only the extremum detection circuit (PIC), the segmenting circuit (BIN), the initialization circuit (INIT) and the programmable phase generator, in order to make the integrated circuit universal and capable of working on a previously digitized and stored signal. It will be understood that the circuit may eventually be specialized to each particular application, for example bar code readers, and it is then possible to integrate, in addition to the means indicated above, the converter and the operating microprocessor.

DESCRIPTION OF THE DRAWINGS

Other characteristics, objects and advantages of the invention will become apparent from the description which follows, with reference to the accompanying drawings which show the invention by way of non-limiting examples. In these drawings, which form an integral part of the present description:

FIGS. 12, 13, 14$a$, 14$b$, 15$a$, 15$b$, 16$a$, 16$b$, 17$a$ and 17$b$ are time line diagrams explaining the operation of the process.

DETAILED DESCRIPTION OF PREFERRED EMBODIMENTS

Figure 2:
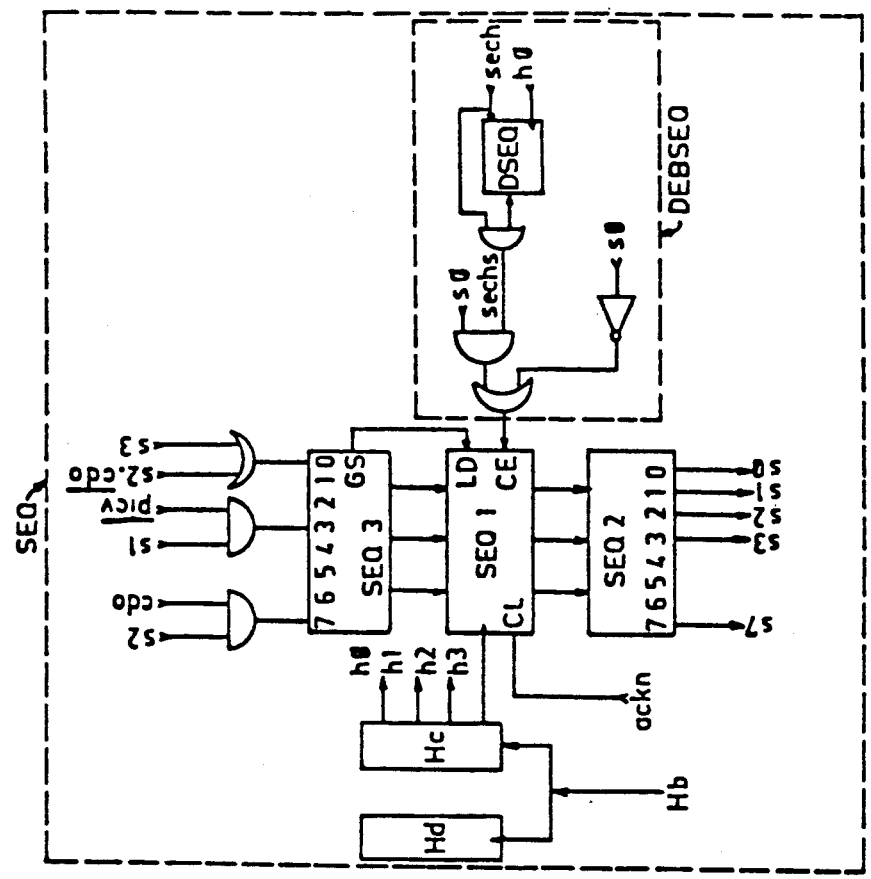
FIG. 2 is a detailed schematic of the sequencer (SEQ)
Figure 1:
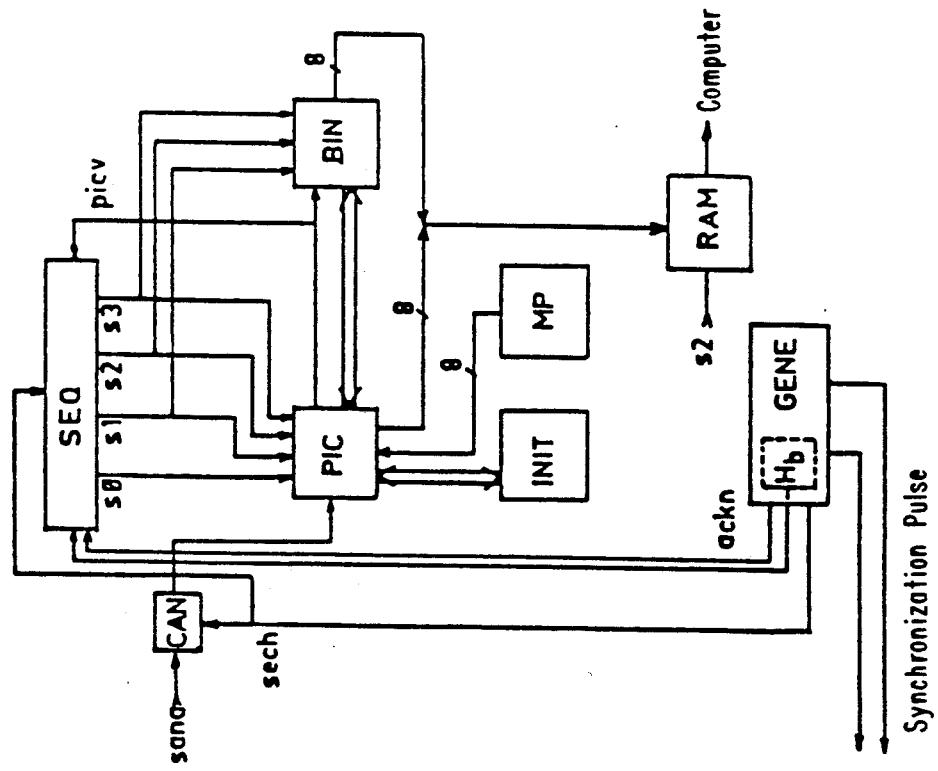
FIG. 1 is an electrical schematic diagram of the assembly of one embodiment of the invention.

The treatment apparatus shown schematically by way of example in the drawings is intended to provide from an analog electric signal Sana (shown in FIGS. 14$a$, 15$a$, 16$a$, 17$a$), a parametrable binary signal representative of the data contained on this analog signal and operable by a conventional computer. The signal Sana may in particular come from image sensors in order to assure an automatic identification of the optical characteristics of an image (bar codes, alpha-numeric characters ...).

The apparatus comprises the functional blocks hereinafter described.

The analog signal Sana is received on an analog/digital converter CAN synchronized by a programmable phase generator GENE. In the example, the sensor providing the analog signal Sana is of the CCD type, and requires synchronization pulses. The generator GENE, constituted in a conventional manner by an assembly of counters of which the counted values are previously loaded for parametering it, delivers to the CCD sensor the necessary synchronization pulses, and to the convertor CAN a parametrable sampling frequency sech. The synchronization pulses comprise, in this case, a signal Sana representative of an image, the pixel synchronization pulses, and the beginning and end of line synchronization pulses. In the example, the sampling frequency delivered to the converter CAN is equal to the pixel synchronization frequency.

Further, the generator GENE delivers to a sequencer (SEQ) a signal —ackn— for assuring the beginning and the end of the treatment process, at the beginning and the end of each Sana line.

The sequencer SEQ is intended to assure the sequencing of the treatment (that is, the succession of treatment cycles), said treatment being carried out in two essential circuits: an extremum detection circuit PIC with which is associated an initialization circuit (INIT), and a segmenting circuit BIN.

An assembly of parameter memory registers MP may initially be loaded to furnish to the PIC circuit several treatment parameters which permit obtaining on each line a parametrable binary signal adapted to certain characteristics of the signal Sana emitted from the sensor (noise threshold —a—, permissible interval between two significant data —dmin, dmax—, for example minimum and maximum distances between the bars of a bar code, minimum contrast to consider between two successive data —K—, maximum variation in luminence between two successive pixels —Vmax—, revealing defective pixels in case of too great a variation). The assembly MP may be loaded by any means, and in particular by the operating computer as a function of a specific program.

In relation to the sequences, the result of the treatment is written into a result memory (RAM), line by line, the operating computer coming to read in this memory for selecting and interpreting the binary signal written therein.

FIG. 2 gives by way of example the conventional cabled structure of the sequencer SEQ. This sequencer comprises a counter $SEQ_1$ which is set at zero by the signal —ackn— between two lines. Its counting is incremented by one of the outputs of a conventional clock system, comprising a base clock $H_b$ (in the example integrated in the generator GENE), a divider $H_d$ and a decoder $H_c$ in order to deliver clock signals $h_0$, $h_1$, $h_2$, $h_3$ intended to synchronize the basic steps of each cycle of treatment.

The outputs of the counter $SEQ_1$ are decoded in a decoder $SEQ_2$ in order to generate the validation signals of the treatment cycles, in the example five in number, as will be seen later ($s_0$, $s_1$, $s_2$, $s_3$, $s_7$). The two signals $s_0$ and $s_1$ have the same frequency, equal to the sampling frequency. The four clock signals $h_0$, $h_1$, $h_2$, $h_3$ are shifted with a cyclic relation of ¼ to produce four synchronization pulses for each cycle ($s_0 \ldots s_7$). In the schematic, there have been designated in a conventional manner by the symbol $s_1.h_j$ the signal $s_i$ present at the peaks of the clock $h_j$. These signals are obtained by a logic matrix ET between the outputs of the decoder $H_c$ and the decoder $SEQ_2$.

The treatment is controlled on the sampling frequency during the cycle $s_0$ by a circuit DEBSEQ which validates the passage of the cycle $s_0$ to the cycle $s_1$ upon command of the sampling frequency —sech—. This circuit which itself is known (circuit generating a pulse when the pulses rise from the sampling frequency) combines a flip flop and two gates ET.

A sensor $SEQ_3$ delivers the coded sequence break values to the loading inputs of the counter $SEQ_1$ and a validation signal to its validation loading input. To this effect, the coder receives through the OR and AND gates the sequence break signals ($s_2$, $s_3$, $s_1$, $\overline{picv}$, $cd_0$, $\overline{cd_0}$) emitted by the decoder $SEQ_2$ and the PIC circuit.

Figure 3:
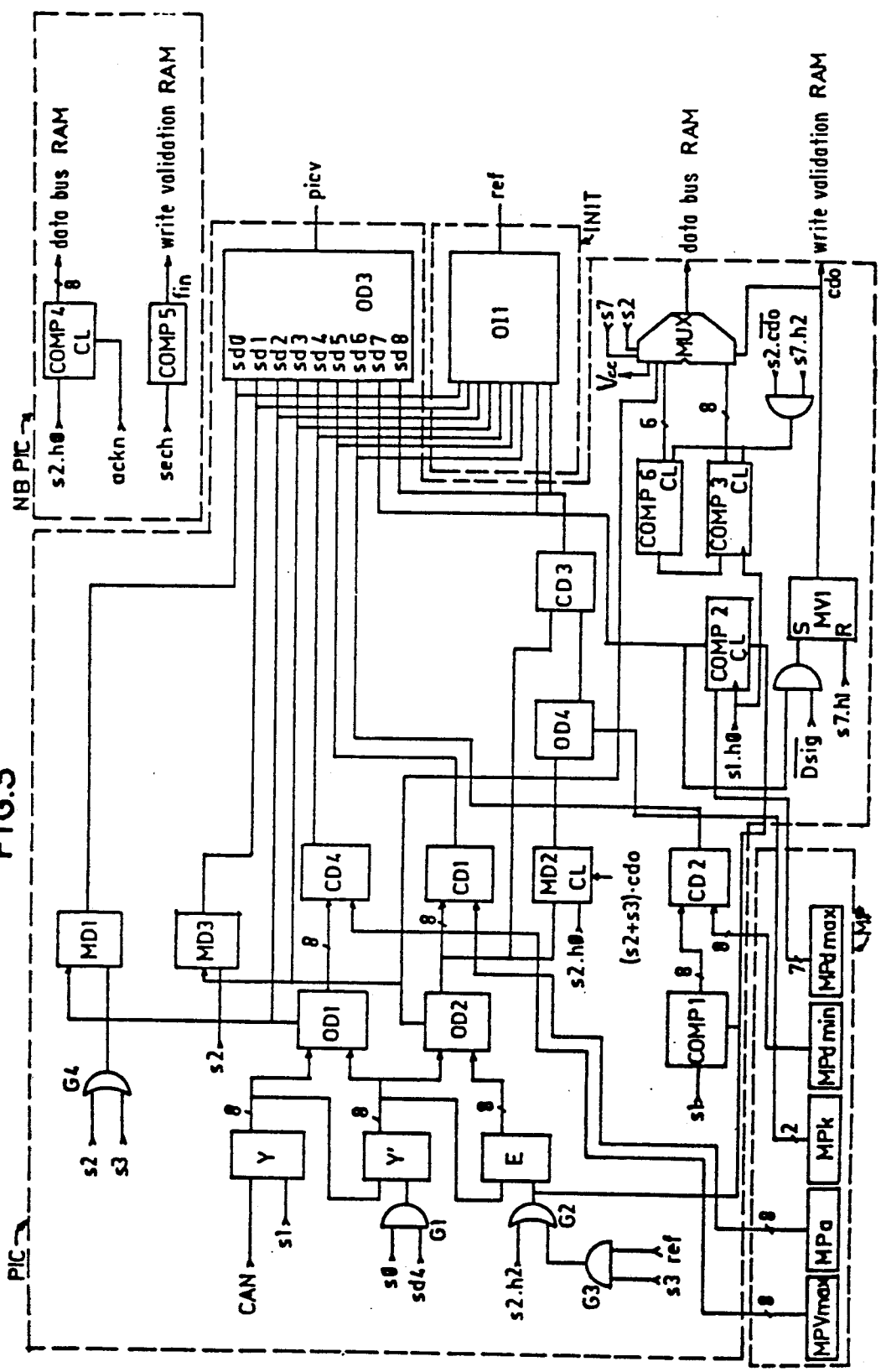
FIG. 3 is a detailed schematic of the extremum detection circuit (PIC) and of the initializing circuit (INIT)

FIG. 3 illustrates the structure of the extremum detection circuit PIC and of the associated initialization circuit INIT.

This detection circuit PIC comprises two successive sampling memory registers Y and Y', and a valid extremum memory register E.

The first register Y receives the digitized signal emitted by the converter CAN and the cycle validation signal $s_1$ which controls the loading of each sample to the sampling frequency. It should be noted that each sample corresponds to a pixel and will sometimes be designated by this term. It is characterized by its position (in time) and by its amplitude.

The second register Y' is connected to the first and receives the validation signal $s_0$ through an AND gate ($G_1$) intended to inhibit the loading controlled by $s_0$ in case of a defective pixel.

Thus, in the register Y is stored the current sample $y_p$ corresponding to the step (p) considered in the current sequence, and in the register Y' the sample ($y_{p-1}$) of the preceding step, which in case of validation constitutes the new extremum.

The register E receives the output of the register Y' and is loaded by the intervention of the gates $G_2$ and $G_3$, either by the validation signal $s_2$, or by the signal $s_3$ in case of the presence of a reference —Ref—. Thus, this register E contains either the preceding extremum $E_{n-1}$ or the last reference $R_m$.

A difference computing operator $OD_1$ is connected to the registers Y and Y' to deliver the sign of the difference to a sign storing flip-flop $MD_1$, and the absolute value of the difference $|y_p - y_{p-1}|$ to a comparator $CD_4$ for the recognition of defective pixels (in case of too great a difference in amplitude, greater than the parameter Vmax). For this reason, the comparator $CD_4$ receives on its other comparison input, the output of a parameter storage register $MP_{Vmax}$ in which has been previously loaded the parameter Vmax, a parameter indicating the difference in maximum amplitude between two successive samples.

In the comparator $CD_4$, the difference $|y_{p-1} - y_p|$ is compared to Vmax for generating a binary comparison signal $sd_4$.

The sign storage flip flop $MD_1$ receives through an OR gate ($G_4$) the cycle validation signal $s_2$ or $s_3$ in order to store the sign of the difference $y_p - y_{p-1}$ at each of the cycles and generate a corresponding sign signal $sd_0$.

Another difference computing operator $OD_2$ is connected to the registers Y' and E for delivering the sign of the difference to a sign storage flip flop $MD_3$, and the absolute value of the difference $|y_p - E_{n-1}|$ to a comparator $CD_1$ in order to recognize the signal used with respect to the noise. For this reason, the comparator $CD_1$ receives on its other comparison input the output of a parameter storage register $MP_a$ in which is previously loaded the threshold —a— of the level of residual noise.

In the comparator $CD_1$, the difference $|y_{p-1} - E_{n-1}|$ is compared to the threshold —a— to generate a binary comparison signal $sd_5$.

The sign storage flip-flop $MD_3$ receives the validation signal $s_2$ in order to store the sign of the difference $y_{p-1} - E_{n-1}$ for the cycle and to generate a corresponding sign signal $sd_1$.

Further, the assembly of registers MP comprises a register $MP_K$ for storage of a ratio K of the differences of values between successive extremums. This register delivers the parameter K which is previously loaded therein, to a division operator $OD_4$, which is connected by its other input to a storage register $MD_2$ for the relative height of the extremum.

This register $MD_2$ receives the difference $|y_{p-1} - E_{n-1}|$ from the operator $OD_2$ and the validation signal $s_2$ which controls the storage therein (this signal $s_2$ is generated by the sequencer SEQ upon validation of a sampling as an extremum). The register $MD_2$ stores therefor the height (or amplitude) of the extremum coming to be validated with respect to that of the preceding extremum $E_{n-2}$ (designated by the relative height $H_{n-1}$ of the extremum). This register is reset to zero by a signal $cd_0$ (which will be described later) in the presence of the signals $s_2$ OR $s_3$.

The output of the operator $OD_4$ is connected to a comparator $CD_3$ in order to furnish it with the signal $H_{n-1} \times K$. This is further connected to the operator $OD_2$ which delivers to it the difference $|y_{p-1} - E_{n-1}|$. This comparator furnishes a binary comparison signal $sd_8$.

Further, the circuit PIC comprises a counter $COMP_1$ adapted to be incremented to the sampling frequency due to a validation signal $s_1$, and reset to zero upon each extremum or reference validation, its reset input at zero being connected to the output of the gate $G_2$.

The counter $COMP_1$ delivers its counted value to an input of the comparator $CD_2$ which receives at its other input a parameter —dmin— previously loaded into a storage register for the minimum distance $MP_{dmin}$.

Thus, the counter $COMP_1$ counts down the number of steps since the beginning of the sequence (validation of the last extremum $E_{n-1}$) and its count value represents the distance —d— separating the current sampling $y_{p-1}$ and the preceding extremum $E_{n-1}$. This distance —d— is compared to the parameter —dmin— in order to deliver a binary comparison signal $sd_6$ permitting validating an extremum only if this distance d is greater than the programmed minimum dmin. This arrangement excludes parasitic extremums, for example parasitic black spots in an interval between two bars of a bar code.

Further, the assembly of registers MP includes a register $MP_{dmax}$ for storing the maximum distance —dmax—. As will be seen below, this arrangement permits the initialization unit INIT to validate a reference $R_m$ which will serve as a reference in the detection of a new extremum, in order to avoid, in this case being referenced to a too distant extremum, which will be without relation to the following extremum.

The circuit PIC comprises for this purpose a counter $COMP_2$ connected to the register $MP_{dmax}$ for loading its count value. This counter is decremented by the validation signal $s_1.h_0$ at each sample, which returns to carry out a comparison of the number of steps (distance d) to the parameter dmax. When the value of the count of this counter $COMP_2$ exceeds dmax, a binary comparison signal $sd_7$ representative of the relative values of —d— and dmax is delivered. The counter $COMP_2$ is loaded with the value dmax by the signal from the gate $G_2$.

Moreover, a counting assembly, comprising in the example two counters $COMP_3$ and $COMP_6$ (in order to be able to work on 14 bits), is incremented by the signal $s_1$ from the sequencer SEQ in order to count down the number of steps —de— between two successive extremums. These counters are reset to zero by the signal $s_7.h_2$ or the signal $\overline{cd_0.s_2}$ (already described). A flip flop $MV_1$ ("Set and Reset") is connected to the input of the counter $COMP_2$ for storing the equality d=dmax in the absence of a significant component (due to a signal —dsig— described below). This flip flop is connected at its output to a multiplexer MUX, in such a manner that the number of steps —de— between two extremums may be inserted into the result memory RAM after validation of each extremum distant from the preceding by a number of steps at least equal to dmax. To this end, the multiplexer MUX is connected to the counting assembly $COMP_3$, $COMP_6$ in order to load the value —de— thereof in the result memory RAM. The multiplexer MUX is also connected to the operator $OD_2$ for inserting the sign of this value into said memory.

Further, the apparatus comprises an operator $OD_3$ connected to the input of the operator $OD_1$ for receiving the signal $sd_2$, to the register $MD_1$ for receiving the signal $sd_0$, to the comparator $CD_1$ for receiving the signal $sd_5$, to the comparator $CD_2$ for receiving the signal $sd_6$, to the flip flop $MD_3$ for receiving the signal $sd_1$, to the operator $OD_2$ for receiving the signal $sd_3$, to the comparator $CD_4$ for receiving the signal $sd_4$, to the counter $COMP_2$ for receiving the signal $sd_7$ and to the comparator $CD_3$ for receiving the signal $sd_8$.

This operator $OD_3$ validates the sample as an extremum while generating an extremum validation signal —picv— which is delivered to the sequencer SEQ in order to obtain the signal $s_2$ corresponding to the cycles of treatment of the valid extremums.

The operator $OD_3$ is cabled in such a manner as to generate the validation signal picv when the following validation conditions are united:

| | |
|---|---|
| (signal $sd_5$) | $\|y_{p-1} - E_{n-1}\| > a$ |
| (signal $sd_6$) | $d > dmin$ |
| (signals $sd_0$ and $sd_2$) | sign inversion between successive samples |
| (signal $sd_8$) | $\|y_{p-1} - E_{n-1}\| > K.H_{n-1}$ |
| (signal $sd_1$ and $sd_3$) | sign inversion between successive extremums |
| (signal $sd_4$) | $\|y_{p-1} - y_p\| < Vmax$ |

Further, the validation signal picv is forced in the case in which the following conditions are achieved:

| | |
|---|---|
| (signal $sd_4$) | $\|y_{p-1} - y_p\| > Vmax$ |
| (signal $sd_7$) | $d = dmax$ |
| (signal dsig) | dsig active (translating the presence of a significant component as will be seen below). |

The forced validation which intervenes in this latter case provides a pseudo-extremum in case of the disappearance of the useable signal, this pseudo-extremum permitting treatment of the last useful transition signal. This pseudo-extremum separated from the preceding by the distance d=dmax will be taken into account in the segmentating.

Further, the initialization unit INIT which is associated with the detection unit PIC described above, comprises an operator $OI_1$ which is arranged in parallel with respect to the operator $OD_3$ of the PIC circuit in such a manner as to receive the assembly of signals $sd_0$ through $sd_8$ which converge thereon, due to the parallel connections with the output of the corresponding members.

The operator $OI_1$ generates a reference signal —Ref— which is delivered to the register E (through the gate $G_3$) to validate certain samples as reference $R_0$, $R_1 \ldots R_m$ during the cycles $s_3$.

The operator $OI_1$ is cabled in such a manner that this reference validation takes place when the following initialization conditions are satisfied:

| | |
|---|---|
| (signal $sd_0$ and $sd_2$) | inversion of sign between successive samples |
| (signal $sd_4$) | $\|y_{p-1} - y_p\| < Vmax$ |

AND at least one of the following conditions:

| | |
|---|---|
| (signal $sd_5$) | $\|y_{p-1} - E_{n-1}\| < a$ |
| (signal $sd_6$) | EITHER d < dmin OR |
| (signal $sd_8$) | $\|y_{p-1} - E_{n-1}\| < K.H_{n-1}$ |
| OR (signals $sd_1$ and $sd_3$) | identical sign of the magnitudes $(y_{p-1} - E_{n-1})$ and $(E_{n-1} - E_{n-2})$. |

Further, the validation of the reference is forced in the case in which the following conditions are achieved:

| | |
|---|---|
| (signal $sd_4$) | $\|y_{p-1} - y_p\| < Vmax$ |
| (signal $sd_7$) | $d = dmax$ |
| (signal dsig) | dsig inactive. |

The forced validation of the reference which intervenes in this latter case furnishes a pseudo-reference in case of the absence of the useful signal, to reinitialize in a repetitive manner the reference searching sequence even if the preceding initialization conditions are not fulfilled.

In addition, in the example illustrated in FIG. 3, the apparatus comprises a valid extremum counting circuit NPBic comprising a counter $COMP_4$ for the number of valid extremums and a counter $COMP_5$ for the number of samples, arranged to deliver and store the contents of the counter $COMP_4$ after passage of a predetermined number of samples. The counter $COMP_4$ is incremented by the extremum validation signal $s_2$, is reset to zero by the signal —ackn— at each beginning of treatment and delivers at the output binary values on the data bus of the result memory RAM. The counter $COMP_5$ is incremented by the sampling frequency —sech— emitted by the phase generator GENE. It thus validates by its output the writing in the RAM memory of the contents of the counter $COMP_4$ after passage of a number of samples corresponding to a window of predetermined width.

In this manner, these counters permit obtaining a recognition phase of the presence of a significant component which precedes the treatment phase by segmenting and which consists, after sequential detection of the extremums by the PIC circuit, of counting and storing the number of valid extremums with respect to the above mentioned window. The working computer compares this number to a given threshold in such a manner as to deduce the probable presence or absence of a significant component. These dispositions only permit starting the segmenting treatment in the presence of a significant component. For example, in a portable auto-feeding system for the detection of bar codes, the segmenting treatment which is associated with a bar code illuminator (principal user of energy) is only released in the presence of a significant component, that is a bar code, which reduces the consumption of energy.

Figure 4:
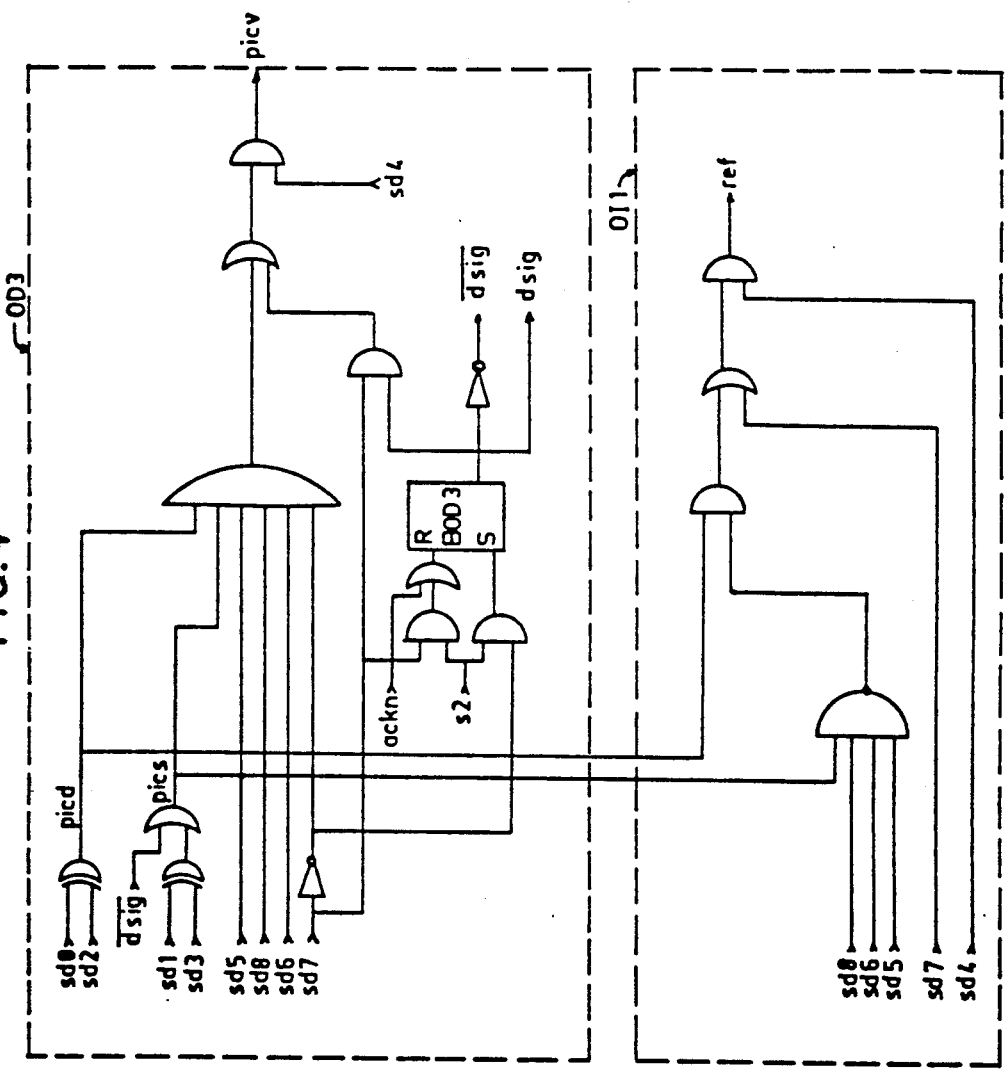
FIG. 4 gives an example of the operators for these circuits (PIC) and (INIT)

FIG. 4 provides an embodiment of the operators $OD_3$ and $OI_1$, providing the aforementioned combinatorial calculations. These operators, themselves known to the skilled artisan, essentially combine the exclusive OR, AND, NAND gates, an inverter and a "set and reset" flip flop $BOD_3$. This flip flop $BOD_3$ stores the presence of absence of a significant component and its output dsig mentioned above permits validating only the pseudo-extremum a single time after disappearance of the significant component.

Figure 5:
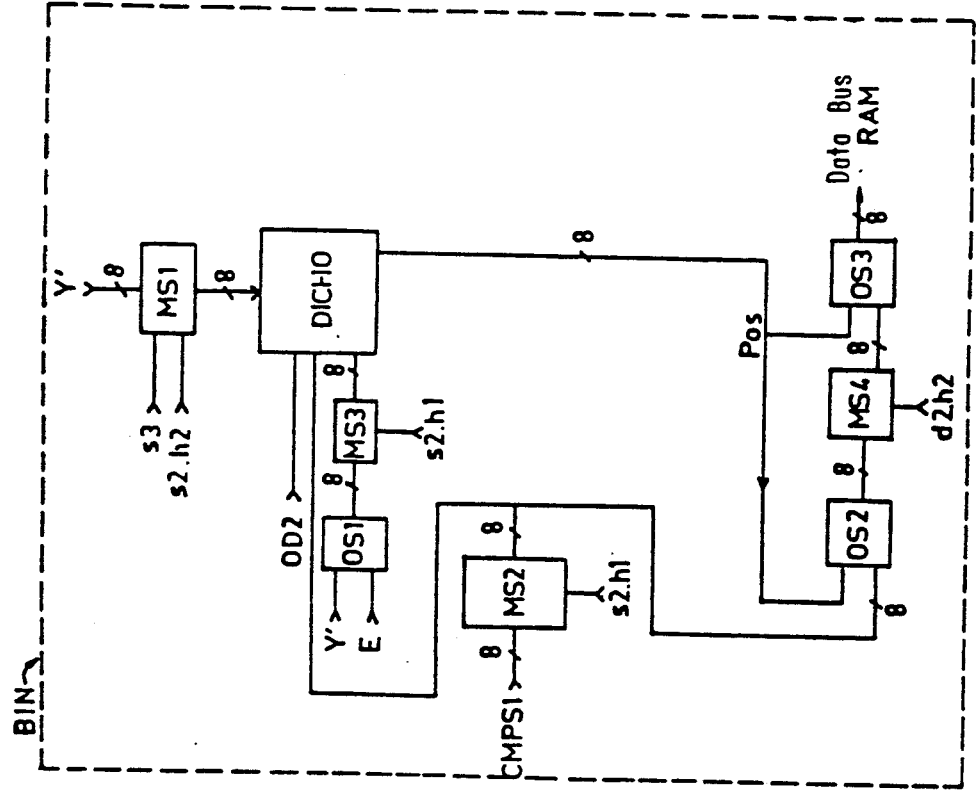
FIG. 5 is a detailed schematic of the segmenting circuit (BIN)

FIG. 5 is a detailed schematic of the segmenting circuit BIN.

This circuit comprises a memory $MS_1$ for the temporary storage of samples of a sequence, which receives these samples from the register Y'. This memory contains an address counter $CMPS_1$ which is incremented by the signal $s_3$ and which is reset to zero by the signal $s_2.h_2$.

This memory is connected to a unit DICHO for heuristic searching, to which it delivers the amplitude of the sample which is addressed to it.

The extremum storage means $MS_2$, in particular a register, receives the output of the address counter $CMPS_1$ for storing therein the value upon validation of the signal $s_2.h_1$. The output of $MS_2$ is connected to the unit DICHO and to an operator $OS_2$ for calculating distance. It furnishes the upper limit of the segmenting (the lower limit being zero) to the unit DICHO and to the operator $OS_2$.

A summing operator $OS_1$ is provided for calculating the half-sum of the last two extremums $$\frac{E_{n-1} = E_n}{2}$$

($E_{n-1}$ may be a reference $R_m$). To this end, the operator $OS_1$ receives the outputs of the registers Y' and E, and its output is connected to a threshold storage register $MS_3$, which is validated by the extremum validation signal $s_2$. This threshold is delivered to the unit DICHO. For carrying out the dichotomizing searching in the increasing or decreasing direction, the unit DICHO receives both the output of the operator $OD_2$ giving the sign or the difference between the last two extremums $E_n - E_{n-1}$.

The unit DICHO generates a temporal position signal —pos— for each treated sample. The signal —pos— is delivered to two operators, one for calculating the distance $OS_2$, the other $OS_3$ for summing. The operator $OS_2$ is connected to means $MS_2$ and carries out a calculation of distance (number of steps) between the last extremum $E_n$ and the sample pos.

This distance is delivered to a temporary distance storage register $MS_4$ which is validated by a signal —$d_2.h_2$— (coming from the sequencer SEQDICHO described below) in order to store the distance $l'_{n-1}$ separating the last extremum $E_n$ and the median sample identified by the unit DICHO.

The operator $OS_3$ carries out the summing, at each validation by the signal —fin—:

of the distance $l'_{n-1}$ between the preceding average sample (stored in the register $MS_4$) and the extremum $E_{n-1}$, and the distance $l_n$ between the current sample (arriving at the unit DICHO) and the extremum $E_{n-1}$.

The result $l'_{n-1} + l_n$ is delivered to the result memory RAM.

Figure 6:
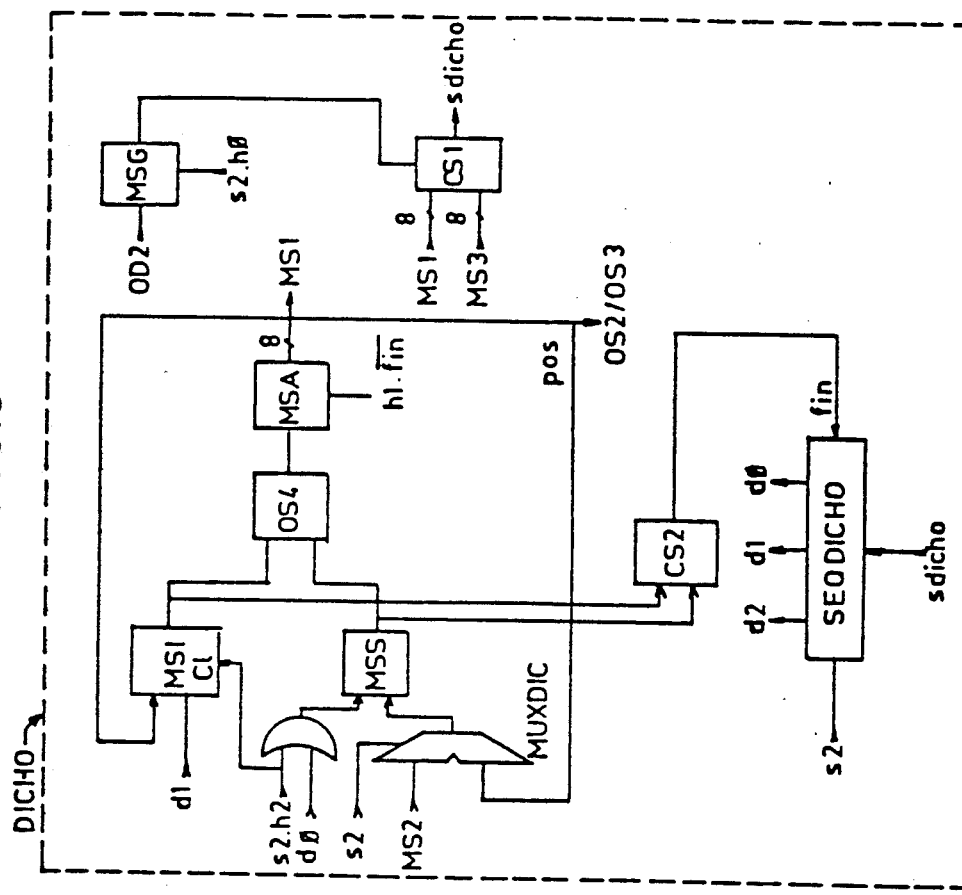
FIGS. 6 and 7 are detailed schematics showing one of the (DICHO) units of the segmenting circuit (BIN)

One embodiment of the heuristic searching unit DICHO is shown schematically in FIG. 6. This unit comprises essentially:

two storage registers $MS_i$, $MS_s$ for a lower limit and an upper limit, a summing operator $OS_4$, connected at its input to two registers $MS_i$, $MS_s$ for operating a median address calculation, and at its output to an intermediate storage register $MS_a$ connected to the memory $MS_1$ for addressing it with a sample, said operator $OS_4$ associated with its register $MS_a$ being connected to the registers $MS_i$, $MS_s$, a sign storage register $MS_g$ connected to the operator $OD_2$, a comparator $CS_1$ connected to the register $MS_g$, to the memory $MS_1$ for receiving the adressed sample and to the threshold storage register $MS_3$, for delivering a comparison signal (sdicho), a segmenting sequencer SEQDICHO connected at its input to the comparator $CS_1$ and at its output to the registers $MS_i$, $MS_s$ for validating one of the stored limits, a comparator $CS_2$, connected to the registers $MS_i$, $MS_s$ for delivering a signal of equality to the sequencer SEQDICHO intended to stop the dichotomizing search.

Further, a multiplexer MUXDIC is interposed in the loop toward the register $MS_s$ in order to initialize said register upon the detection of each extremum $s_2$, by the stored upper limit in the register $MS_2$. After this initialization of the dichotomizing search, the multiplexer MUXDIC simply transmits the output of the register $MS_a$.

The result —sdicho— of the comparison carried out in the comparator $CD_1$ between the amplitude of the threshold and the amplitude of the sample leaves the memory $MS_1$, is delivered to the segmenting sequencer SEQDICHO for generating either a dichotomizing search cycle $d_{0a}$ or a cycle $d_1$, in such a manner as to validate the output of the register $MS_a$ either as an upper limit in the register $MS_s$, or as a lower limit in the register $MS_i$, and this until obtaining an equality at the output of the comparator $CS_2$ which generates the signal —fin— which in turn positions the sequencer SEQDICHO in the cycle $d_2$.

Figure 7:
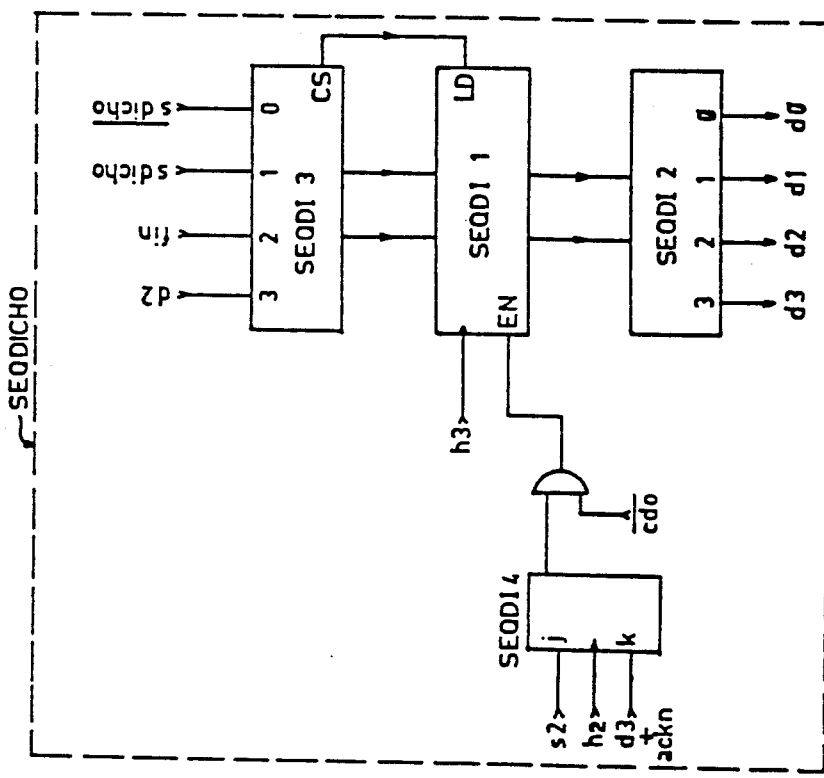

FIG. 7 shows one embodiment of the segmenting sequencer SEQDICHO intended to assure the sequencing of the dichotomy. This sequencer comprises a counter $SEQDI_1$ which is validated while counting at the output of a flip flop $SEQDI_4$ (of the JK type), its counting being incremented by the clock signals $h_3$.

The outputs of the counter $SEQDI_1$ are decoded in a decoder $SEQDI_2$ in order to generate the validation signals of the dichotomizing cycles ($d_0$, $d_1$, $d_2$).

A coder $SEQDI_3$ delivers the break values of the coded sequences to the loading inputs of the counter $SEQDI_1$, and a validation signal to its validation loading input. To this end, the coder receives sequence break signals —sdicho— (output of the comparator $CS_1$), —sdicho— (output after inversion), —fin— (output of the comparator $CS_2$) and $d_2$ (output of $SEQDI_2$).

This coder SEQDI$_1$ is incremented by the clock signal h$_3$.

The flip flop SEQDI$_4$, synchronized by the clock signal h$_2$, validates the count of the counter SEQDI$_1$ on command of the signal s$_2$ and blinds this count on command of the signal d$_3$ or —ackn—. This latter signal d$_3$ is a state of the sequencer emitting from the decoder SEQDI$_2$ corresponding to a period of inactivity thereof.

Figure 8:
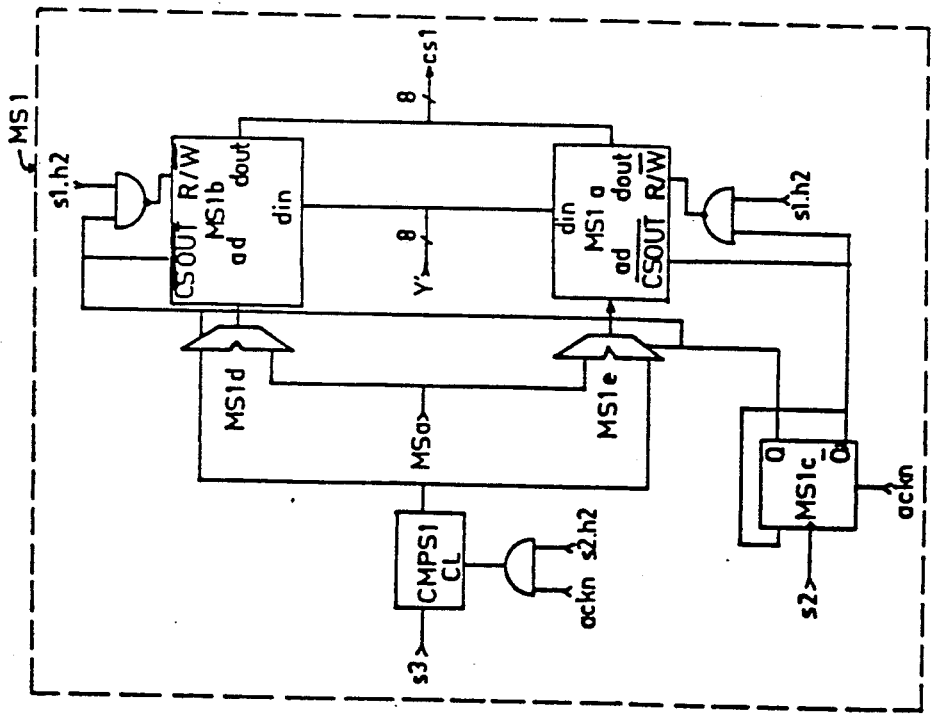
FIG. 8 is an example of one of the memories ($MS_1$) of the segmenting circuit (BIN) and its access.

FIG. 8 shows a known embodiment of the temporary storage memory MS$_1$. This memory is arranged to work alternatively on two zones MS$_1$a and MS$_1$b which are loaded and segmented alternatively.

The alternation is controlled by a flip flop MS$_1$c. The multiplexers MS$_1$d, MS$_1$e assure the alternative loading-/segmenting signal emission.

Figure 9:
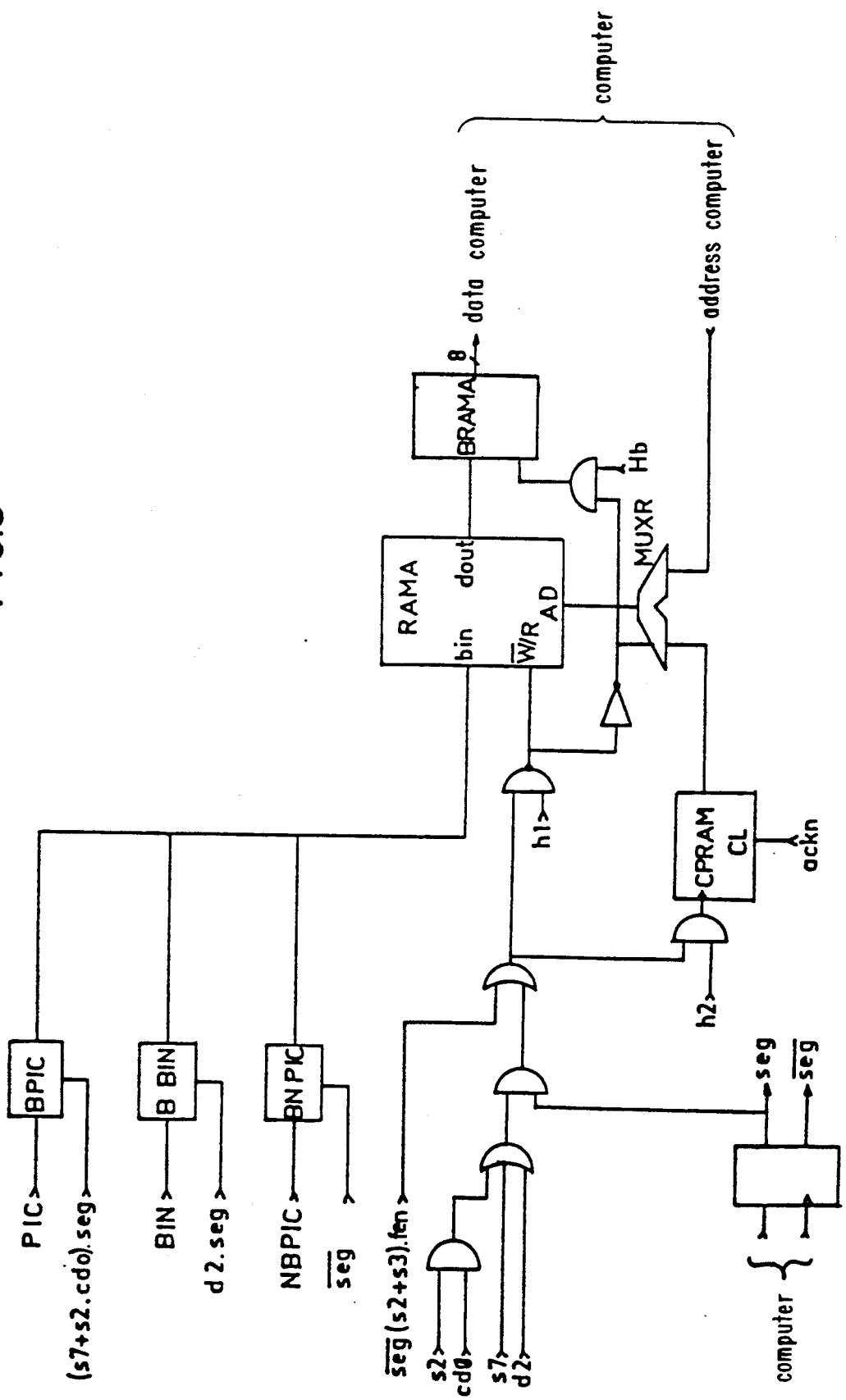
FIG. 9 is an example of the circuit showing the result memory (RAM) and its access.

FIG. 9 shows an example of one embodiment of the result memory RAM.

This result memory RAM comprises a read-write memory RAMA comprising an input port and an output port. The input port is connected to buffers BPIC, BBIN and BNBPIC which are respectively connected to the PIC, BIN and NBPIC circuits.

The output port is connected through the intermediary of the register BRAMA to the bus of the operating computer.

The writing of the data results of the segmenting or the calculation of the number of valid extremums is synchronized by the clock h$_1$.

The written adress is achieved by the counter CPRAM which is incremented after each writing validation on the clock h$_2$.

The counter CPRAM adresses sequentially the memory RAMA through a multiplexer MUXR which connects the output of the counter CPRAM to the memory RAMA during the validation in the writing of the memory RAMA.

In every other configuration, the memory RAMA is validated by read out to the computer through the register BRAMA which stores the data adressed by the computer through the multiplexer MUXR.

The write validation of the memory RAMA being very short with respect to its read out validation, one can simultaneously access the write memory RAMA by the segmenting circuit BIN and the reading memory by the computer. Thus, in a known manner, a circular buffer with simultaneous read/write access is provided.

Figure 10A:
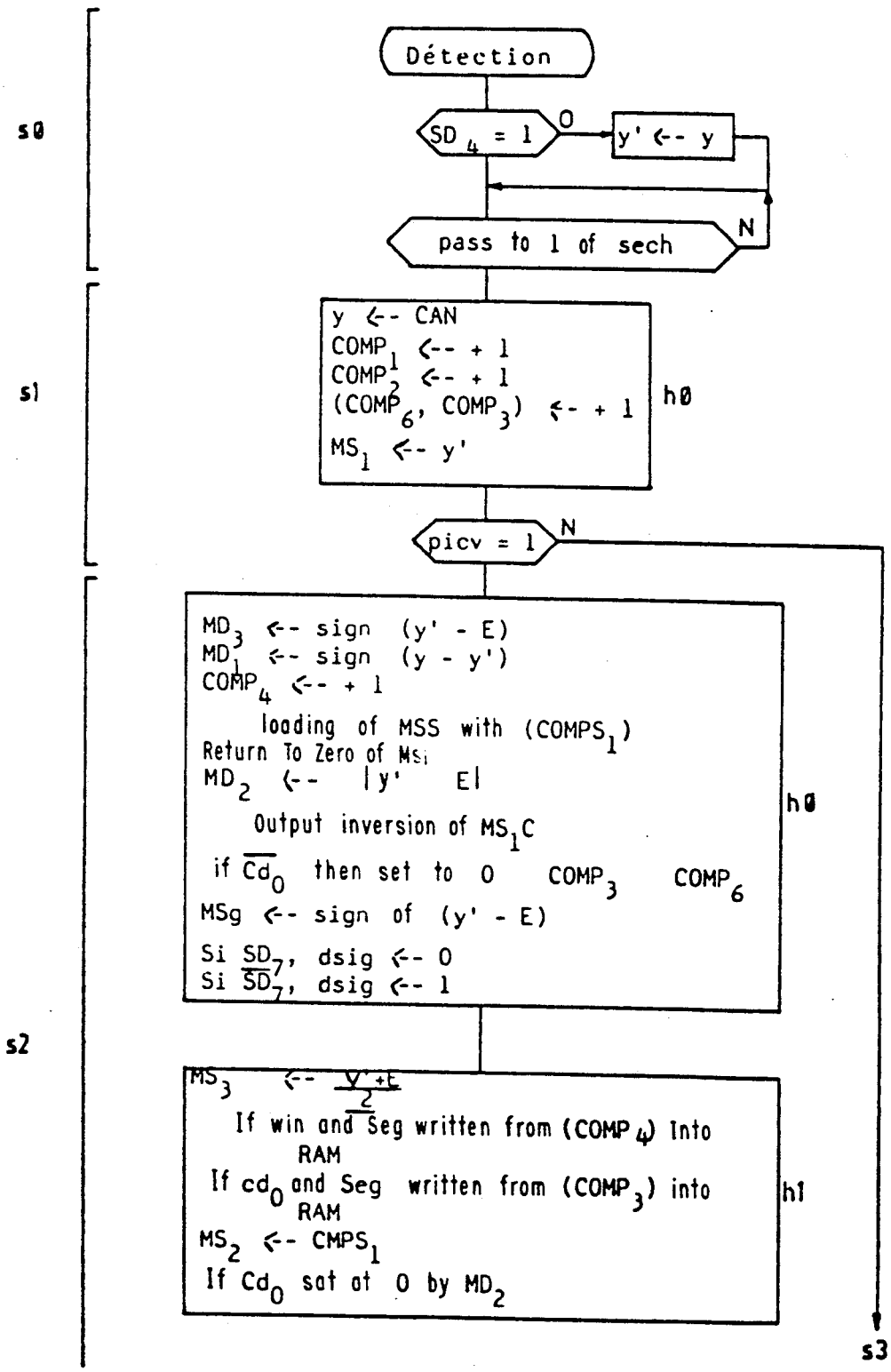
FIGS. 10$a$, 10$b$ and 11 are flow diagrams showing the operation of the process.
Figure 10B:
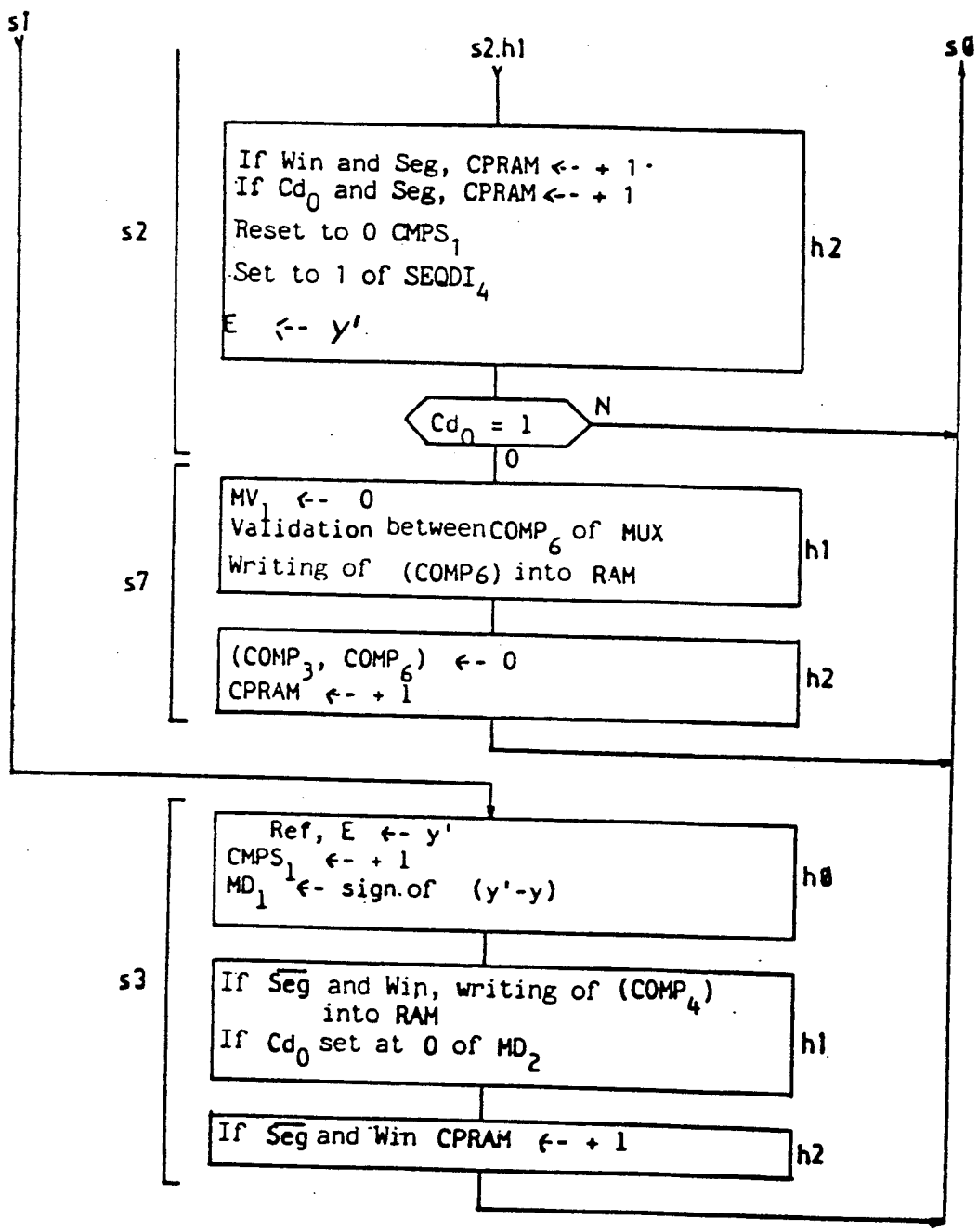

FIG. 10a and its complement FIG. 10b present a flowchart of the extremum detection treatment. These figures will cause to appear the cycles s$_0$, s$_1$ ... during which each phase is carried out. The clock signals h$_0$, h$_1$ and h$_2$ synchronize the different phases of each cycle, while the clock signals h$_3$ direct the succession of the cycles. Current symbols have been used for this type of flow chart.

FIG. 11 presents in a similar manner the segmenting treatment flow chart, with its cycles d$_0$, d$_1$, d$_2$, and the synchronizing clock signals h$_0$, h$_1$, h$_2$.

FIG. 12 illustrates an example of the operation of the sequencer SEQ.

The base clock H$_b$ generates the four synchronizing pulses h$_0$, h$_1$, h$_2$ and h$_3$ permitting during each cycle s$_0$, s$_1$, s$_2$, s$_3$ and s$_7$ the synchronization of the different operations carried out during these cycles.

This sequencer is controlled on the sampling frequency —sech— through the signal —sechs— (arrow $\delta_0$) which generates a pulse upon validation of the sample, permitting the passage of the cycle s$_0$ to the following cycles.

The frequency H$_b$ is calculated in such a manner that the maximum time of treatment during one pixel will be less that the period of sampling.

FIG. 13 illustrates one example of the operation of the memory RAM.

This memory is validated in writing by the circuit of the invention and is validated in reading by the operating computer. The writing validation from the BIN circuit is synchronized on h$_1$. The data is present during the cycle d$_2$. The counter CPRAM addresses the memory RAMA during a time, it is incremented during the clock pulse h$_2$ which follows the writing validation.

In any other case, the memory RAM is validated in reading to the computer. The information is stored in the register BRAMA at each clock pulse H$_b$, apart from the writing operations sufficiently transient to not bother the reading of the operating computer.

This is what the arrow $\lambda_1$ shows. In this manner, the reading validation signal of the computer is six times greater than the writing validation of the circuit of the invention.

Figures 14A, 14B:
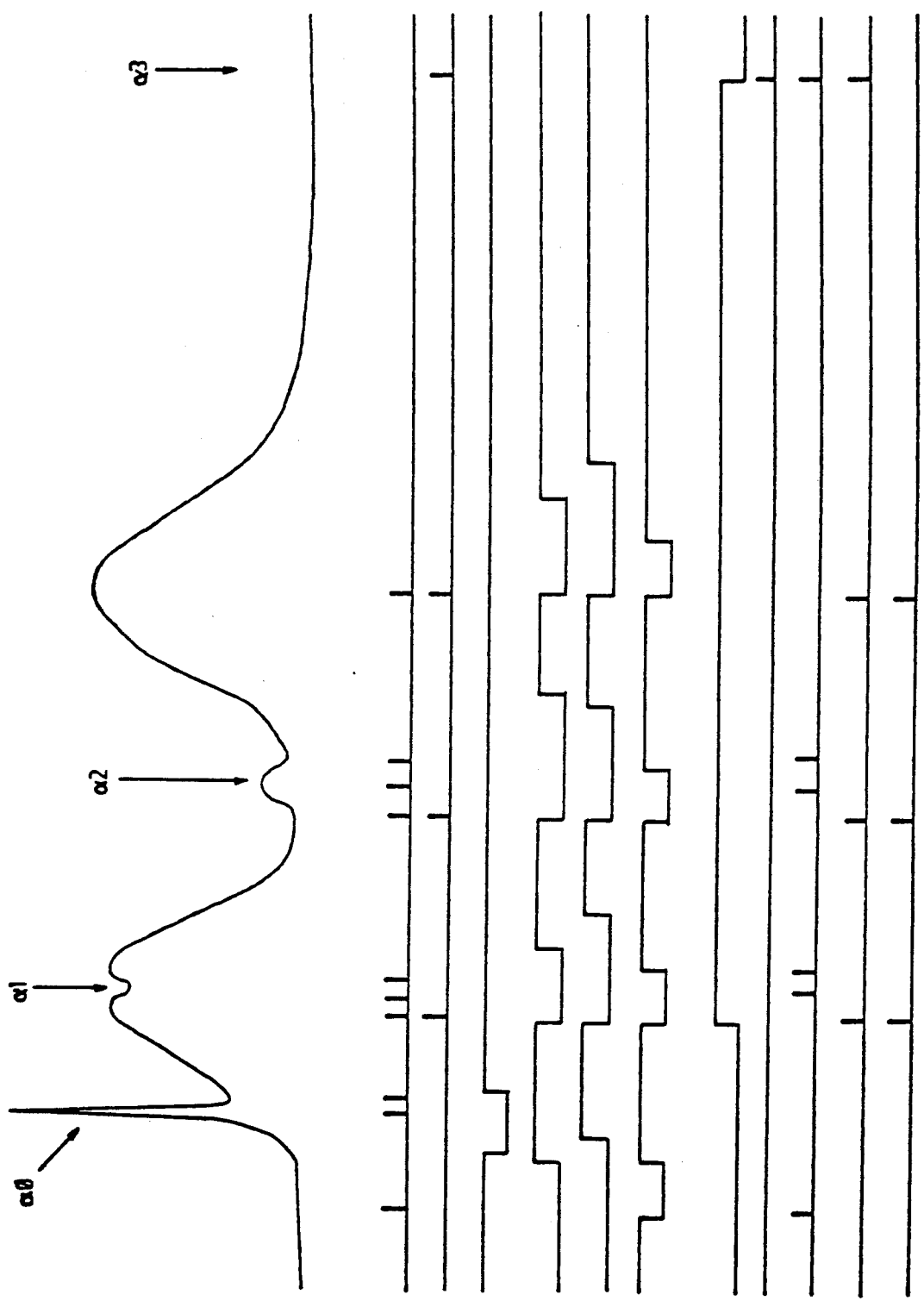

FIGS. 14a and 14b illustrate an extremum detection sequence. The arrows $\alpha_0$, $\alpha_1$ and $\alpha_2$ indicate the rejection of false extremums for the following reasons:

$\alpha_0$: $|y_{p-1} - y_p| > V_{max}$ $\alpha_1$: $d > min$ $\alpha_2$: $|y_{p-1} - E_{n-1}| > K \cdot H_{n-1}$ The arrow $\alpha_3$ indicates the validation of a pseudo-extremum upon disappearance of the significant component.

FIGS. 15a and 15b illustrate a new sequence of extremum detection.

The arrow $\beta_3$ indicates the consideration of a pseudo-extremum upon disappearance of the significant component.

The arrows $\beta_0$, $\beta_1$, $\beta_4$, $\beta_6$ indicate the rejection of false extremums for the following reasons:

$\beta_0, \beta_1$: $|y_{p-1} - E_{n-1}| < K \cdot H_{n-1}$ or the sign of $(E_{n-1} - E_{n-2}) =$ sign of $(y_{p-1} - E_{n-1})$;

2: $|y_{p-1} - y_p > V_{max}$

4: $|y_{p-1} - E_{n-1}| < a$

The arrow $\beta_5$ indicates a an operation of the reference at the time of passage to 1 of sd$_7$.

Figure 16A:
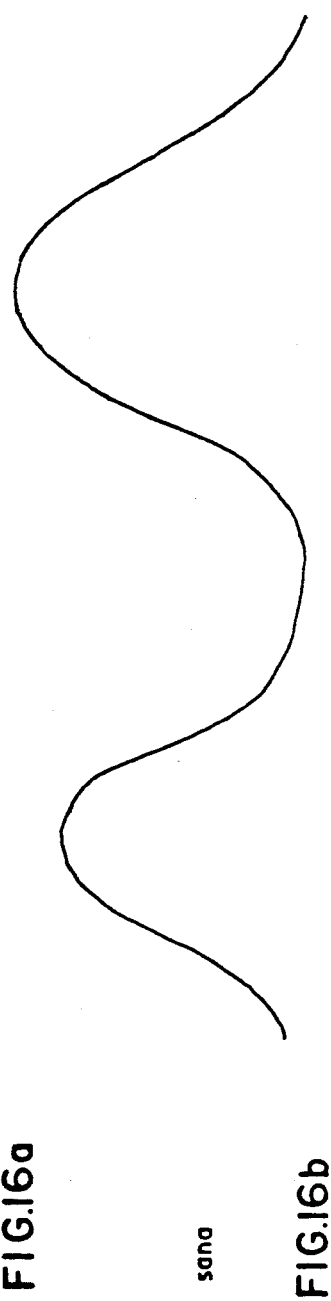
Figure 16B:
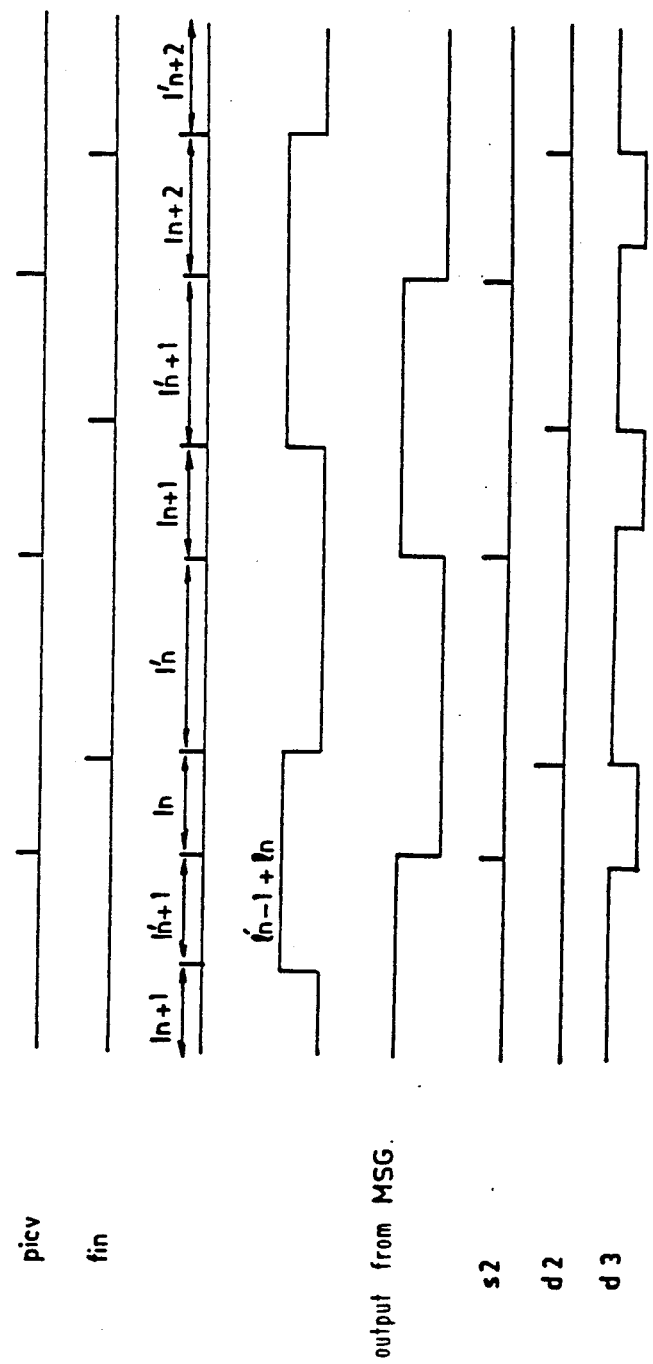

FIGS. 16a and 16b illustrate the segmenting phase. This is emitted in parallel with the detection of each extremum detection, which is effective at each cycle s$_2$. In this case, the sequencer SEQDICHO becomes active and d$_3$ goes to 0 for the entire duration of activity of segmenting.

At each cycle d$_2$, the circuit BIN writes in the memory RAM the corresponding binary segment which in the sequence n is $l_n + l'_{n-1}$.

At the end of the cycle d$_2$, the circuit BIN again becomes inactive, which signifies that the cycle d$_3$ is validated anew.

Figure 17A:
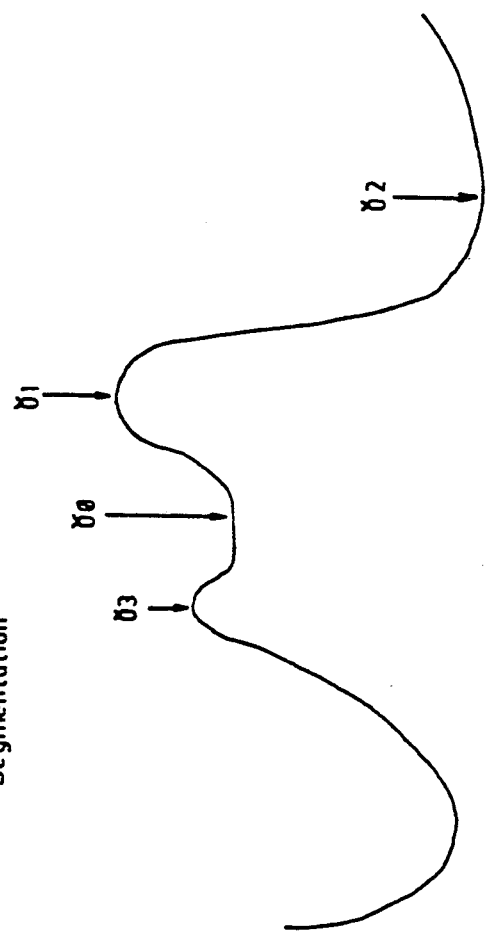
Figure 17B:
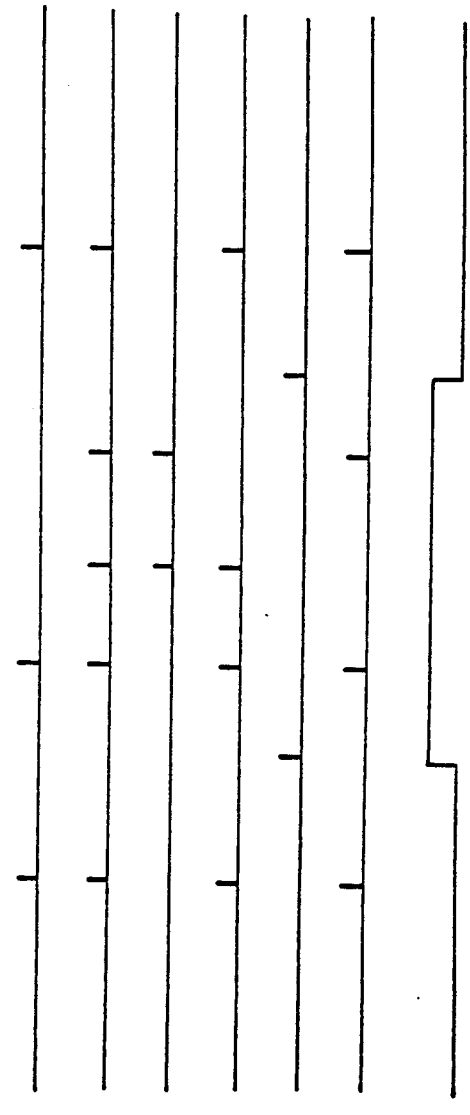

FIGS. 17a and 17b give an example of the extremum detection with extremum rejection in the case in which the condition $|y_{p-1} - E_{n-1}| < K \cdot H_{N-1}$ is not respected (arrow $\gamma_0$).

In this case (arrow α₀) a reference is validated in order that the next detection is made with respect to this sample.

The following extremum will thus be rejected (arrow α₁) because the signs of $(y_{p-1} - E_{n-1})$ and of $(E_{n-1} - E_{n-2})$ are the same (pics=0). By contrast, the reference is made to appear with the value of $y_{p-1}$.

The next extremum (arrow α₂) will be considered, and the segmenting will be carried out with respect to the value of the sample in γ₂ and the value of the sample in γ₁. The transition considered will comprise between γ₃ and γ₂. Thus, a binary signal with a minimum of error is generated.

While this invention has been described as having certain preferred features and embodiments, it will be understood that it is capable of still further variation and modification without departing from the spirit of the invention, and this application is intended to cover any and all variations, modifications and adaptations as fall within the spirit of the invention and the scope of the appended claims.

We claim:

1. A process for the treatment of an analog electric signal including a significant component comprising extremums separated by rising and falling transitions, and a parasitic component comprising a parasitic modulation of the significant component and residual noise, said process permitting the obtention of a parametrable binary signal representative of the significant component of the analog signal and uninfluenced by the parasitic component and comprising:

(t₀) in a preliminary step, storing the chosen values for the following parameters: the minimum distance (dmin) between two successive extremums, the threshold (a) of the level of residual noise, (t₁) converting said analog signal to a digital signal on an assembly of values adapted to differentiate the extremums of the analog signal, and carrying out said conversion with a sampling frequency sufficient to sample the transitions of said signal, for obtaining a series of numeric samples representative of the extremums and of the transitions of the analog signal, (t₂) sequentially detecting the successive extremums of the numeric signal, while carrying out an iterative treatment having as the current sequence (n) the following sequence:

storing the extremum $(E_{n-1})$ detected in the preceding sequence $(n-1)$, storing at each step (p) of the sequence a current numeric sample $(y_p)$ corresponding to said step and a previous sample $(y_{p-1})$ of the next preceding step, calculating the absolute value of the difference $Y_{p-1} - E_{n-1}$, comparing said absolute value to said noise threshold (a) and generating a first binary comparison signal (sd₅), counting down the number of steps since the beginning of the sequence for calculating the distance (d) separating said first sample $(Y_{p-1})$ and the preceding extremum $(E_{n-1})$, comparing said distance (d) to said minimum distance (dmin), and generating a second binary comparison signal (sd₆), storing the sign of the difference between said current numeric sample and said previous numeric sample $(y_p - y_{p-1})$, comparing said sign with the corresponding difference sign $(Y_{p-1} - Y_{p-2})$ stored in the next preceding step and generating a binary sign comparison signal (picd), and validating the previous sample $(Y_{p-1})$ as a new extremum $(E_n)$ and storing said new extremum when the comparison signals are representative of the following validation conditions:

and the sign comparison signal (picd) is representative of a sign inversion, $|y_{p-1} - E_{n-1}| > a \quad d > dmin$ (t₃) carrying out at each sequence (n) a segmenting treatment beginning with the detection of each extremum $(E_n)$, by the following operations:

storing the samples $(Y_1 \ldots Y_p)$ which are between the detected extremums $(E_n)$ and the preceding extremum $(E_{n-1})$, operating on said detected and preceding extremums $(E_{n-1}, E_n)$ a summing function for generating a threshold signal (S), search for the average sample having a value closest to this threshold and calculating and storing the distances $(l_n)$ and $(l'_n)$ of this sample with respect to the current and preceding extremums $(E_{n-1})$ and $(E_n)$, and calculating the sum of the distances $(l'_{n-1} + l_n)$ between the average sample of the current sequence (n) and the average sample of the preceding sequence (n-1), and (t₄) storing the sums of the distances ($\ldots, l'_{n-2} + l_{n-1}, l'_{n-1} + l_n, l'_n + l_{n+1}, \ldots$) calculated during the successive sequences, for generating the parametrable binary signal.

2. A treatment process as in claim 1, and including initializing the sequential extremum detection (t₂) during the initialization sequences by means of references $(R_0, R_1, \ldots R_m)$, obtained while carrying out an iterative initialization treatment $(t_i)$ having as the current initialization sequence:

storing at each current step (p) of said initialization sequence a numeric sample $(Y_p)$ corresponding to said current step and the sample $(y_{p-1})$ of the preceding step, comparing the absolute value $Y_{p-1} - E_{n-1}$ to the noise threshold (a) and generating said first binary comparison signal (sd₅), said value $E_{n-1}$ being the last valid extremum or zero at the default of valid extremum, counting down the number of steps since the beginning of the treatment for calculating the distance (d) separating said previous sample $(Y_{p-1})$ from the beginning of treatment of the last reference, comparing said distance (d) to said minimum distance (dmin) and generating a third binary sign comparison signal (sd₆), storing the sign of the difference between the current numeric sample and the previous numeric sample $(y_p - y_{p-1})$ comparing said newly stored sign with the corresponding difference sign $(Y_{p-1} - Y_{p-2})$ stored in the next preceding step and generating a second binary sign comparison signal (picd), and validating the previous sample $(Y_{p-1})$ as a reference $(R_m)$ and storing said new reference when the following initialization conditions are satisfied: the sign comparison signal (picd) is representative of a sign inversion, and at least one of said comparison signals is representative of one of the following inequalities:

3. A treatment process as in claim 2, and including pursuing said iterative initialization treatment ($t_i$) parallel to the extremum detection treatment ($t_2$) in order to furnish new extremum references in case the disappearance of the significant component of the treated signal.

4. A treatment process as in claims 3, and including:
   ($t_0$) in said preliminary step, storing the following parameter: the ratio K of the differences of values between successive extremums,
   ($t_2$) detecting the extremums while adding to the current sequence the following operations:
   storing at the same time as the extremum ($E_{n-1}$) the relative height ($H_{n-1}$) of said extremum with respect to that of the preceding extremum ($E_{n-2}$),
   comparing the difference $|y_{p-1}-E_{n-1}|$ to the value of $H_{1-n} \times K$, where K is the previously stored ratio, and generating a fourth binary comparison signal ($sd_8$),
   validating the sample ($y_{p-1}$) as a new extremum ($E_n$) and storing it, only when said validation conditions are satisfied and, otherwise, where the following inequality is also satisfied:

$$|y_{p-1}-E_{n-1}| > K.H_{n-}.$$

5. A treatment process as in claim 4, and including carrying out said iterative initialization treatment ($t_i$) while validating and storing at each initialization sequence the sample ($y_{p-1}$) as a reference ($R_m$) in the case in which the following initialization conditions are satisfied: the sign comparison signal (picd) is representative of a sign inversion, and at least one of said comparison signals is representative of one of the following inequalities:

$$|y_{p-1}-E_{n-1}| < a \; d < dmin$$

$$|y_{p-1}-E_{n-1}| < K.H_{n-1}$$

where K is the ratio previously stored, $E_{n-1}$ is the last valid extremum or zero for want of a valid extremum, and $H_{n-1}$ the relative height of said last extremum or zero.

6. A process as in claim 2, and including:
   ($t_0$) in said preliminary step, storing the following parameter: distance —dmax— between successive extremums,
   ($t_1$) generating the references while adding to the current initialization sequence the following operations:
   comparing the distance —d— to the maximum distance —dmax— for generating a binary comparison signal ($sd_7$) representative of the relative values of —d— and —dmax—,
   validating the sample ($y_{p-1}$) as a new reference ($R_m$) and storing it when said initialization conditions are satisfied, or when said comparison signal is representative of the equality d=dmax.

7. A treatment process as in claim 6 and wherein in the detection of the extremums ($t_2$), if at one sequence said comparison signal becomes representative of the inequality $d \geq dmax$, counting down the number of steps separating the preceding extremum $E_{n-1}$ from the following extremum $E_n$ and storing the distance —de— separating the extremum ($E_{n-1}$) from the extremum ($E_n$).

8. A treatment process as in claim 7, characterized in that ($t_2$) in the case of a comparison signal representative of the inequality $d \geq dmax$, after detection of the extremum $E_n=y_{p-1}$, storing at the same time as the distance —de—, the sign of said difference ($y_p-y_{p-1}$).

9. A treatment process as in claim 8, characterized in that if during the detection of the extremums ($t_2$), said comparison signal becomes representative of the equality d=dmax, carrying out a segmenting treatment ($t_3$) while considering as the last extremum $E_n$ the sample $Y_{p-1}$ separated from the preceding extremum $E_{n-1}$ by a distance d=dmax in order to consider the average sample of this last sequence during the generation of said binary signal.

10. A treatment process as in claim 2, and including:
    ($t_0$) in the preliminary stage, storing the following parameter: the difference in maximum amplitude Vmax between two successive samples,
    ($t_2$) detecting the extremums while adding to the current sequence (n) the following operations:
    calculating the absolute value of the difference $|y_{p-1}-y_p|$, comparing it to the difference in maximum amplitude preliminarily stored and generating a binary comparison signal ($sd_4$),
    validating said previous sample ($y_{p-1}$) as a new extremum ($E_n$) and storing it only when said validation conditions are satisfied and otherwise when said comparison signal is representative of the inequality $|y_{p-1}-y_p| < Vmax$.

11. A treatment process as in claim 10 and including ($t_i$) in the initialization treatment, detecting the references while adding to the current initialization sequence the following operations:
    calculating the absolute value of the difference $|y_{p-1}-y_p|$, comparing it to the difference in maximum amplitude Vmax preliminary stored, and generating a binary comparison signal ($sd_4$),
    validating said previous sample ($y_{p-1}$) as a reference ($R_m$) and storing it in the case in which the aforesaid initialization conditions are satisfied and further where said comparison signal is representative of the inequality $|y_{p-1}-y_p| < Vmax$.

12. A process as in claims 2 for the treatment of an analog signal representative of an image, associated with synchronization pulses of pixels and synchronization pulses of the beginning and the end of lines, and including:
    ($t_1$) causing the sampling frequency of the analog/numeric conversion to correspond with the pixel pulse synchronization frequency or a multiple thereof,
    ($t_i$) commencing the iterative initialization treatment at each synchronization pulse for the beginning of a line,
    ($t_2$, $t_3$) stopping the treatment at each end of line synchronization pulse.

13. A process as in claim 1 and including ($t_2$) detecting the extremums while adding after validation of a first extremum the following operation to each sequence (n):
    calculating at the end of the preceding sequence (n−1) the current sequence considered (n), the sign of the difference $E_{n-1}-E_{n-2}$ and storing it ($sd_1$),
    calculating at each step of the current sequence (n) the sign of the difference $y_{p-1}-E_{n-1}$ ($sd_3$), comparing the sign of the difference $y_{p-1} - E_{n-1}$ with that of the difference $E_{n-1} - E_{n-2}$ and generating a binary comparison signal of the sign (pics), validating the sample only in the case in which the validation conditions heretofore stated are satisfied and in which said sign comparison signal is representative of a sign inversion.

14. A process as in claim 13, characterized in that ($t_2$) in the case in which said previous sample ($Y_{p-1}$) is not valid by reason of an identity of the sign of the values ($Y_{p-1} - E_{n-1}$) and ($E_{n-1} - E_{n-1}$), storing said previous sample ($Y_{p-1}$) to serve as a reference in said segmenting treatment ($t_3$), said reference ($Y_{p-1}$) being substituted for said extremum ($E_{n-1}$) for operating the summing function, searching for the average sample and calculating the distance ($l'_{n-1} + l_n$).

15. A treatment process as in claim 1 and including ($t_3$) in the segmenting treatment, operating the following summing function on the extremums:

$$S = \frac{E_{n-1} + E_n}{2}.$$

16. A treatment process as in claim 1 and including ($t_3$) in the segmentation treatment, searching for the average sample by a dichotomizing process comprising considering the sample situated in the middle of the segment $E_{n-1} E_n$, comparing its value with the threshold (S), and thereby approaching by successive iterations the sample having the value closest to the threshold.

17. A treatment process as in claim 1 comprising a phase of the recognition of the presence of a significant component, preceding the generation of the parametrable binary signal, and further comprising:
  ($t'_2$) detecting sequentially the extremums by the sequences such as already defined, and
  ($t_5$) counting and storing the number of valid extremums with respect to a window corresponding to a predetermined number of samples, for delivering a datum representative of the probable presence or absence of a significant component.

18. An apparatus for treatment of an analog electric signal for delivering a parametrable binary signal comprising:
  an assembly of parameter storage registers (MP) having storage registers ($MP_a$, $MP_{dmin}$) for storing noise (a) and minimum distance (dmin),
  an analog/numeric converter (CAN) arranged to carry out the conversion at a predetermined sampling frequency,
  a sequence (SEQ) adapted to control the cycles of operation to be carried out at each sampling period by a sequential validation of each functional unit of the apparatus,
  an extremum detection circuit (PIC) having:
    first and second registers (Y, Y') for the storage of successive samples, said first register (Y) being connected to the converter (CAN), said second register being connected to said first register,
    a third register (E) for the storage of the extremum and connected to the second register (Y'),
    a first operator ($OD_1$) for calculating difference, connected to the first and second registers (Y, Y') and associated with a sign storage flip flop ($MD_1$),
    a second difference calculating operator ($OD_2$) connected to the second and third registers (Y', E),
    a first comparator ($CD_1$) connected to the operator ($OD_2$) and to one of said noise storage registers ($MP_a$),
    a counter ($COMP_1$) adapted to be incremented to the sampling frequency and reset to zero upon each extremum validation,
    a second comparator ($CD_2$) connected to the output of the counter ($COMP_1$) and to one of said minimum distance storage registers ($MP_{dmin}$),
    a combinatorial calculating operator connected at its input to said first operator ($OD_1$), to said storage flip flop ($MD_1$), to said first comparator ($CD_1$) and to said second comparator ($CD_2$), and at its output to said sequencer for delivering thereto an extremum validation signal (pivc),
  a segmentation circuit (BIN) comprising:
    a temporary storage memory ($MS_1$) for samples of a sequence, connected to one of the sample storage registers (Y'),
    extremum storage means ($MS_2$),
    a third operator ($OS_1$) for summing the amplitudes of two successive extremums and associated with a threshold storage register ($MS_3$),
    an heuristic searching unit (DICHO) for samples closest to the threshold and connected to said temporary storage memory ($MS_1$), to said threshold register ($MS_3$) and to said extremum storage means ($MD_2$),
    a distance calculating operator ($OS_2$) connected to said heuristic searching (DICHO) unit and to the extremum storage means ($MS_2$) and associated with a temporary distance storage register ($MS_4$),
    a summation operator connected to said heuristic searching unit (DICHO) and to said temporary distance storage register ($MS_4$) for calculating the length of a segment between successive median samples, and
  a result memory for storing the results furnished thereto.

19. A treatment apparatus of claim 18, and including an initialization circuit (INIT) associated with the extremum detection circuit (PIC), said initialization circuit having a second combinatorial calculation operator ($OI_1$) arranged in parallel with respect to the operator ($OD_3$) of said extremum detection circuit (PIC), said second combinatorial calculation operator ($OI_1$) being connected at its input to said first and second comparators ($CD_1$, $CD_2$), to said operator ($OD_1$) and to said sign storage flip flop ($MD_1$) for delivering to the extremum storage register (E) a reference validation signal (Ref) for storing in said register each valid reference.

20. A treatment apparatus as in claim 19 and wherein the assembly of parameter storage registers comprises a difference ratio storage register ($MP_k$), and said extremum detection circuit (PIC) includes:
  a register ($MD_2$) for storage of relative extremum height,
  a division operator ($OD_4$) connected at its input to said relative extremum storage register ($MD_2$) and to said ratio storage register ($MP_k$) for delivering a divided relative height, and a third comparator (CD₃) connected at its input to said second operator and said division operator for delivering to said operator (OD₃) of said extremum detection circuit a supplementary comparison signal (sd₈).

21. A treatment apparatus as in claim 20 and wherein said third comparator (CD₃) is also connected to said second combinatorial calculation operator (OI₁) of the initialization circuit for delivering said supplementary comparison signal (sd₈) thereto.

22. A treatment apparatus as in claim 21 and wherein said extreme detection circuit (PIC) comprises a flip flop (MD₃) for storing the sign of the difference, connected to said second operator (OD₂) for delivering to said operator of said extremum detection circuit (OD₃) said stored sign of the difference (sd₁), said second operator (OD₂) being connected at its output to said operator of said extremum detection circuit (OD₃) to furnish thereto the current sign (sd₃).

23. A treatment apparatus as in claim 22 and wherein said storage flip flop (MD₃) and said second operator (OD₂) are both connected to said operator (OI₁) of the initialization circuit in order for delivering thereto the stored sign (sd₁) and the current sign (sd₃).

24. A treatment apparatus as in claim 19 and wherein the assembly of parameter storage registers comprises a maximum distance storage register (MP$_{max}$), and the extremum detection circuit (PIC) includes a first counter (COMP₂) connected to said maximum distance storage register (MP$_{dmax}$) for loading its counted value for delivering to said operator of said extremum detection circuit (OD₃) a comparison signal in the event of exceeding said supplementary comparison signal.

25. A treatment apparatus as in claim 24 and wherein the assembly of parameter storage registers includes an amplitude difference storing register (MP$_{vmax}$), and the extremum detection circuit (PIC) includes a fourth comparator (CD₄) connected at its input to the operator of said extremum detection circuit (OD₁) and to said difference storing register (MP$_{vmax}$) for delivering a supplementary comparison signal (sd₄) to said operator of the extremum detection circuit (OD₃).

26. A treatment apparatus as in claim 25 and wherein said fourth comparator (CD₄) is also connected to said operator (OI₁) of the initialization circuit for delivering thereto a supplementary comparison signal (sd₄).

27. A treatment apparatus as in claim 18 and wherein said heuristic searching unit (DICHO) of the segmenting circuit is a dichotomic searching unit comprising:

lower and upper limit storage registers (MS$_i$, MS$_s$), a summation operator (OS₄) connected at its input to said limit storage registers (MS$_i$, MS$_s$) for carrying out a median address calculation, and at its output to an intermediate storage register (MS$_a$) connected to said sample memory (MS₁) for addressing it with a sample, said summation operator (OS₄) associated with said intermediate storage register (MS$_a$) being coupled to said limit storage registers (MS$_i$, MS$_s$), a sign storage register (MS$_g$) connected to said second difference calculating operator (OD₂), a sample receiving comparator (CS₁) connected to said sign storage register (MS$_g$), said sample memory (MS₁) for receiving the sample addressed, and to the threshold storage register (MS₃), for delivering a comparison signal (sdicho), a segmenting sequencer (SEQDICHO) connected at its input to said sample receiving comparator (CS₁) and at its output to said limit storage registers (MS$_i$, MS$_s$) for validating one of the stored limits, and a fifth comparator (CS₂) connected to said limit storage registers (MS$_i$, MS$_s$) for delivering a sign of equality to said sequencer (SEQDICHO) for stopping the dichotomic search.

28. A treatment apparatus as in claim 18 and comprising a programmable phase generator (GENE) for delivering a parametrable sampling frequency to the converter (CAN) and synchronization pulses for the analog signal of a parametrable frequency equal to the sampling frequency or submultiples thereof.

29. A treatment apparatus as in claim 18 and including a valid extremum counting circuit (NBPIC) comprising a second counter (COMP₄) for counting the number of valid extremums and a third counter (COMP₅) for counting the number of samples and arranged to deliver and store the contents of said second counter (COMP₄) after passage of a predetermined number of samples.

* * * * *